(12) United States Patent
Perrella et al.

(10) Patent No.: US 11,093,896 B2
(45) Date of Patent: Aug. 17, 2021

(54) PRODUCT STATUS DETECTION SYSTEM

(71) Applicant: Symbol Technologies, LLC, Holtsville, NY (US)

(72) Inventors: Marco Perrella, Vaughan (CA); Iaacov Coby Segall, Toronto (CA); Jordan K. Varley, Mississauga (CA); Michael Ramputi, Ronkonkoma, NY (US); Ron Mercer, Guelph (CA); Robert E. Beach, Los Altos, CA (US); Adrian J. Stagg, Belfountain (CA)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 16/610,046

(22) PCT Filed: May 1, 2018

(86) PCT No.: PCT/US2018/030419
§ 371 (c)(1),
(2) Date: Oct. 31, 2019

(87) PCT Pub. No.: WO2018/204342
PCT Pub. Date: Nov. 8, 2018

(65) Prior Publication Data
US 2020/0118064 A1    Apr. 16, 2020

Related U.S. Application Data

(60) Provisional application No. 62/492,670, filed on May 1, 2017.

(51) Int. Cl.
*G08B 1/08*    (2006.01)
*G06Q 10/08*   (2012.01)
(Continued)

(52) U.S. Cl.
CPC ....... *G06Q 10/087* (2013.01); *G06F 16/2246* (2019.01); *G06K 9/00671* (2013.01); *H04W 4/021* (2013.01); *H04W 4/35* (2018.02)

(58) Field of Classification Search
CPC ...... G06Q 10/087; H04W 4/35; H04W 4/021; G06F 16/2246; G06K 9/00671
(Continued)

(56) References Cited

U.S. PATENT DOCUMENTS 5,209,712 A    5/1993  Ferri
5,214,615 A    5/1993  Bauer
(Continued)

FOREIGN PATENT DOCUMENTS

CA    2835830    11/2012
CA    3028156    1/2018
(Continued)

OTHER PUBLICATIONS

International Search Report and Written Opinion for International Application No. PCT/US2018/030419 dated Aug. 31, 2018.
(Continued)

*Primary Examiner* — Kerri L McNally
*Assistant Examiner* — Thang D Tran

(57) ABSTRACT

A product status detection system includes a mobile automation apparatus having a sensor to capture data representing a shelf supporting products, responsive to data capture instructions. The system includes a server in communication with the mobile apparatus, having: a mobile apparatus controller to generate data capture instructions for the mobile apparatus; a repository to store captured data from the mobile apparatus; a primary object generator to generate primary data objects from the captured data, each including a location in a common frame of reference; a secondary object generator to generate and store secondary data objects
(Continued)

based on the primary data objects; a detector to identify mismatches between reference data and the secondary data objects; and an alert generator to select a subset of the mismatches, and generate and transmit a status alert corresponding to the subset. The system also includes a client device to receive and display the status alert.

16 Claims, 11 Drawing Sheets

(51) Int. Cl.
    *H04W 4/35*     (2018.01)
    *G06F 16/22*     (2019.01)
    *G06K 9/00*     (2006.01)
    *H04W 4/021*     (2018.01)

(58) Field of Classification Search
    USPC .................................................. 340/539.13
    See application file for complete search history.

(56) References Cited

U.S. PATENT DOCUMENTS

| | | | |
|---|---|---|---|
| 5,408,322 | A | 4/1995 | Hsu et al. |
| 5,414,268 | A | 5/1995 | McGee |
| 5,534,762 | A | 7/1996 | Kim |
| 5,566,280 | A | 10/1996 | Fukui et al. |
| 5,953,055 | A | 9/1999 | Huang et al. |
| 5,988,862 | A | 11/1999 | Kacyra et al. |
| 6,026,376 | A | 2/2000 | Kenney |
| 6,034,379 | A | 3/2000 | Bunte et al. |
| 6,075,905 | A | 6/2000 | Herman et al. |
| 6,115,114 | A | 9/2000 | Berg et al. |
| 6,141,293 | A | 10/2000 | Amorai-Moriya et al. |
| 6,304,855 | B1 | 10/2001 | Burke |
| 6,442,507 | B1 | 8/2002 | Skidmore et al. |
| 6,549,825 | B2 | 4/2003 | Kurata |
| 6,580,441 | B2 | 6/2003 | Schileru-Key |
| 6,711,293 | B1 | 3/2004 | Lowe |
| 6,721,723 | B1* | 4/2004 | Gibson .............. G06F 16/2246 |
| 6,721,769 | B1 | 4/2004 | Rappaport et al. |
| 6,836,567 | B1 | 12/2004 | Silver et al. |
| 6,995,762 | B1 | 2/2006 | Pavlidis et al. |
| 7,090,135 | B2 | 8/2006 | Patel |
| 7,137,207 | B2 | 11/2006 | Armstrong et al. |
| 7,245,558 | B2 | 7/2007 | Willins et al. |
| 7,248,754 | B2 | 7/2007 | Cato |
| 7,277,187 | B2 | 10/2007 | Smith et al. |
| 7,373,722 | B2 | 5/2008 | Cooper et al. |
| 7,474,389 | B2 | 1/2009 | Greenberg et al. |
| 7,487,595 | B2 | 2/2009 | Armstrong et al. |
| 7,493,336 | B2 | 2/2009 | Noonan |
| 7,508,794 | B2 | 3/2009 | Feather et al. |
| 7,527,205 | B2 | 5/2009 | Zhu et al. |
| 7,605,817 | B2 | 10/2009 | Zhang et al. |
| 7,647,752 | B2 | 1/2010 | Magnell |
| 7,693,757 | B2 | 4/2010 | Zimmerman |
| 7,726,575 | B2 | 6/2010 | Wang et al. |
| 7,751,928 | B1 | 7/2010 | Antony et al. |
| 7,783,383 | B2 | 8/2010 | Eliuk et al. |
| 7,839,531 | B2 | 11/2010 | Sugiyama |
| 7,845,560 | B2 | 12/2010 | Emanuel et al. |
| 7,885,865 | B2 | 2/2011 | Benson et al. |
| 7,925,114 | B2 | 4/2011 | Mai et al. |
| 7,957,998 | B2 | 6/2011 | Riley et al. |
| 7,996,179 | B2 | 8/2011 | Lee et al. |
| 8,009,864 | B2 | 8/2011 | Linaker et al. |
| 8,049,621 | B1* | 11/2011 | Egan .................... G06Q 20/208 340/572.1 |
| 8,091,782 | B2 | 1/2012 | Cato et al. |
| 8,094,902 | B2 | 1/2012 | Crandall et al. |
| 8,094,937 | B2 | 1/2012 | Teoh et al. |
| 8,132,728 | B2 | 3/2012 | Dwinell et al. |
| 8,134,717 | B2 | 3/2012 | Pangrazio et al. |
| 8,189,855 | B2 | 5/2012 | Opalach et al. |
| 8,199,977 | B2 | 6/2012 | Krishnaswamy et al. |
| 8,207,964 | B1 | 6/2012 | Meadow et al. |
| 8,233,055 | B2 | 7/2012 | Matsunaga et al. |
| 8,260,742 | B2* | 9/2012 | Cognigni ................ G06F 16/27 707/620 |
| 8,265,895 | B2 | 9/2012 | Willins et al. |
| 8,277,396 | B2 | 10/2012 | Scott et al. |
| 8,284,988 | B2 | 10/2012 | Sones et al. |
| 8,346,783 | B2* | 1/2013 | Bai ...................... G06Q 10/087 707/751 |
| 8,423,431 | B1 | 4/2013 | Rouaix et al. |
| 8,429,004 | B2 | 4/2013 | Hamilton et al. |
| 8,463,079 | B2 | 6/2013 | Ackley et al. |
| 8,479,996 | B2 | 7/2013 | Barkan et al. |
| 8,520,067 | B2 | 8/2013 | Ersue |
| 8,542,252 | B2 | 9/2013 | Perez et al. |
| 8,571,314 | B2 | 10/2013 | Tao et al. |
| 8,599,303 | B2 | 12/2013 | Stettner |
| 8,630,924 | B2 | 1/2014 | Groenevelt et al. |
| 8,660,338 | B2 | 2/2014 | Ma et al. |
| 8,743,176 | B2 | 6/2014 | Stettner et al. |
| 8,757,479 | B2 | 6/2014 | Clark et al. |
| 8,812,226 | B2 | 8/2014 | Zeng |
| 8,923,893 | B2 | 12/2014 | Austin et al. |
| 8,939,369 | B2 | 1/2015 | Olmstead et al. |
| 8,954,188 | B2 | 2/2015 | Sullivan et al. |
| 8,958,911 | B2 | 2/2015 | Wong et al. |
| 8,971,637 | B1 | 3/2015 | Rivard |
| 8,989,342 | B2 | 3/2015 | Liesenfelt et al. |
| 9,007,601 | B2 | 4/2015 | Steffey et al. |
| 9,037,287 | B1 | 5/2015 | Grauberger et al. |
| 9,064,394 | B1 | 6/2015 | Trundle |
| 9,070,285 | B1 | 6/2015 | Ramu et al. |
| 9,120,622 | B1* | 9/2015 | Elazary .................. B25J 9/1697 |
| 9,129,277 | B2 | 9/2015 | Macintosh |
| 9,135,491 | B2 | 9/2015 | Morandi et al. |
| 9,159,047 | B2 | 10/2015 | Winkel |
| 9,171,442 | B2 | 10/2015 | Clements |
| 9,247,211 | B2 | 1/2016 | Zhang et al. |
| 9,329,269 | B2 | 5/2016 | Zeng |
| 9,349,076 | B1 | 5/2016 | Liu et al. |
| 9,367,831 | B1 | 6/2016 | Besehanic |
| 9,380,222 | B2 | 6/2016 | Clayton et al. |
| 9,396,554 | B2 | 7/2016 | Williams et al. |
| 9,400,170 | B2 | 7/2016 | Steffey |
| 9,424,482 | B2 | 8/2016 | Patel et al. |
| 9,517,767 | B1 | 12/2016 | Kentley et al. |
| 9,542,746 | B2 | 1/2017 | Wu et al. |
| 9,549,125 | B1 | 1/2017 | Goyal et al. |
| 9,562,971 | B2 | 2/2017 | Shenkar et al. |
| 9,565,400 | B1 | 2/2017 | Curlander et al. |
| 9,589,353 | B2 | 3/2017 | Mueller-Fischer et al. |
| 9,600,731 | B2 | 3/2017 | Yasunaga et al. |
| 9,600,892 | B2 | 3/2017 | Patel et al. |
| 9,612,123 | B1 | 4/2017 | Levinson et al. |
| 9,639,935 | B1 | 5/2017 | Douady-Pleven et al. |
| 9,697,429 | B2 | 7/2017 | Patel et al. |
| 9,766,074 | B2 | 9/2017 | Roumeliotis et al. |
| 9,778,388 | B1 | 10/2017 | Connor |
| 9,779,205 | B2* | 10/2017 | Namir .................. G06F 16/2246 |
| 9,791,862 | B1 | 10/2017 | Connor |
| 9,805,240 | B1 | 10/2017 | Zheng et al. |
| 9,811,754 | B2 | 11/2017 | Schwartz |
| 9,827,683 | B1 | 11/2017 | Hance et al. |
| 9,880,009 | B2 | 1/2018 | Bell |
| 9,928,708 | B2 | 3/2018 | Lin et al. |
| 9,953,420 | B2 | 4/2018 | Wolski et al. |
| 9,980,009 | B2 | 5/2018 | Jiang et al. |
| 9,994,339 | B2 | 6/2018 | Colson et al. |
| 9,996,818 | B1 | 6/2018 | Ren et al. |
| 10,019,803 | B2 | 7/2018 | Venable et al. |
| 10,111,646 | B2 | 10/2018 | Nycz et al. |
| 10,121,072 | B1 | 11/2018 | Kekatpure |
| 10,127,438 | B1 | 11/2018 | Fisher et al. |
| 10,197,400 | B2 | 2/2019 | Jesudason et al. |
| 10,210,603 | B2 | 2/2019 | Venable et al. |
| 10,229,386 | B2 | 3/2019 | Thomas |
| 10,248,653 | B2 | 4/2019 | Blassin et al. |

(56) References Cited

U.S. PATENT DOCUMENTS

| | | | |
|---|---|---|---|
| 10,262,294 B1* | 4/2019 | Hahn | H03K 17/962 |
| 10,265,871 B2 | 4/2019 | Hance et al. | |
| 10,289,990 B2 | 5/2019 | Rizzolo et al. | |
| 10,336,543 B1 | 7/2019 | Sills et al. | |
| 10,349,031 B2 | 7/2019 | DeLuca | |
| 10,352,689 B2 | 7/2019 | Brown et al. | |
| 10,373,116 B2 | 8/2019 | Medina et al. | |
| 10,394,244 B2 | 8/2019 | Song et al. | |
| 2001/0031069 A1 | 10/2001 | Kondo et al. | |
| 2001/0041948 A1 | 11/2001 | Ross et al. | |
| 2002/0006231 A1 | 1/2002 | Jayant et al. | |
| 2002/0059202 A1* | 5/2002 | Hadzikadic | G06K 9/6282 |
| 2002/0097439 A1 | 7/2002 | Braica | |
| 2002/0146170 A1 | 10/2002 | Rom | |
| 2002/0158453 A1 | 10/2002 | Levine | |
| 2002/0164236 A1 | 11/2002 | Fukuhara et al. | |
| 2003/0003925 A1 | 1/2003 | Suzuki | |
| 2003/0094494 A1 | 5/2003 | Blanford et al. | |
| 2003/0174891 A1 | 9/2003 | Wenzel et al. | |
| 2004/0021313 A1 | 2/2004 | Gardner et al. | |
| 2004/0084527 A1* | 5/2004 | Bong | G06Q 30/06 235/385 |
| 2004/0131278 A1 | 7/2004 | imagawa et al. | |
| 2004/0240754 A1 | 12/2004 | Smith et al. | |
| 2005/0016004 A1 | 1/2005 | Armstrong et al. | |
| 2005/0114059 A1 | 5/2005 | Chang et al. | |
| 2005/0174351 A1* | 8/2005 | Chang | G06T 11/206 345/440 |
| 2005/0213082 A1 | 9/2005 | DiBernardo et al. | |
| 2005/0213109 A1 | 9/2005 | Schell et al. | |
| 2006/0032915 A1 | 2/2006 | Schwartz | |
| 2006/0045325 A1 | 3/2006 | Zavadsky et al. | |
| 2006/0106742 A1 | 5/2006 | Bochicchio et al. | |
| 2006/0285486 A1 | 12/2006 | Roberts et al. | |
| 2007/0036398 A1 | 2/2007 | Chen | |
| 2007/0074410 A1 | 4/2007 | Armstrong et al. | |
| 2007/0272732 A1 | 11/2007 | Hindmon | |
| 2008/0002866 A1 | 1/2008 | Fujiwara | |
| 2008/0025565 A1 | 1/2008 | Zhang et al. | |
| 2008/0027591 A1 | 1/2008 | Lenser et al. | |
| 2008/0077511 A1* | 3/2008 | Zimmerman | G06Q 10/00 705/28 |
| 2008/0159634 A1 | 7/2008 | Sharma et al. | |
| 2008/0164310 A1 | 7/2008 | Dupuy et al. | |
| 2008/0175513 A1 | 7/2008 | Lai et al. | |
| 2008/0181529 A1 | 7/2008 | Michel et al. | |
| 2008/0183730 A1* | 7/2008 | Enga | G06F 16/29 |
| 2008/0238919 A1 | 10/2008 | Pack | |
| 2008/0294487 A1* | 11/2008 | Nasser | G06Q 30/0203 705/7.32 |
| 2009/0009123 A1 | 1/2009 | Skaff | |
| 2009/0024353 A1 | 1/2009 | Lee et al. | |
| 2009/0057411 A1 | 3/2009 | Madej et al. | |
| 2009/0059270 A1 | 3/2009 | Opalach et al. | |
| 2009/0060349 A1 | 3/2009 | Linaker et al. | |
| 2009/0063306 A1* | 3/2009 | Fano | G06Q 10/087 705/28 |
| 2009/0063307 A1* | 3/2009 | Groenovelt | G06Q 10/087 705/28 |
| 2009/0074303 A1 | 3/2009 | Filimonova et al. | |
| 2009/0088975 A1 | 4/2009 | Sato et al. | |
| 2009/0103773 A1 | 4/2009 | Wheeler et al. | |
| 2009/0125350 A1 | 5/2009 | Lessing et al. | |
| 2009/0125535 A1 | 5/2009 | Basso et al. | |
| 2009/0152391 A1 | 6/2009 | McWhirk | |
| 2009/0160975 A1 | 6/2009 | Kwan | |
| 2009/0192921 A1 | 7/2009 | Hicks | |
| 2009/0206161 A1 | 8/2009 | Olmstead | |
| 2009/0236155 A1 | 9/2009 | Skaff | |
| 2009/0252437 A1 | 10/2009 | Li et al. | |
| 2009/0287587 A1 | 11/2009 | Bloebaum et al. | |
| 2009/0323121 A1 | 12/2009 | Valkenburg et al. | |
| 2010/0017407 A1 | 1/2010 | Beniyama et al. | |
| 2010/0026804 A1 | 2/2010 | Tanizaki et al. | |
| 2010/0070365 A1 | 3/2010 | Siotia et al. | |
| 2010/0082194 A1 | 4/2010 | Yabushita et al. | |
| 2010/0091094 A1 | 4/2010 | Sekowski | |
| 2010/0118116 A1 | 5/2010 | Tomasz et al. | |
| 2010/0131234 A1 | 5/2010 | Stewart et al. | |
| 2010/0141806 A1 | 6/2010 | Uemura et al. | |
| 2010/0161569 A1* | 6/2010 | Schreter | G06F 16/2272 707/696 |
| 2010/0171826 A1 | 7/2010 | Hamilton et al. | |
| 2010/0208039 A1 | 8/2010 | Setettner | |
| 2010/0214873 A1 | 8/2010 | Somasundaram et al. | |
| 2010/0235033 A1 | 9/2010 | Yamamoto et al. | |
| 2010/0241289 A1 | 9/2010 | Sandberg | |
| 2010/0257149 A1* | 10/2010 | Cognigni | G06F 16/27 707/698 |
| 2010/0295850 A1 | 11/2010 | Katz et al. | |
| 2010/0315412 A1 | 12/2010 | Sinha et al. | |
| 2010/0326939 A1 | 12/2010 | Clark et al. | |
| 2011/0047636 A1 | 2/2011 | Stachon et al. | |
| 2011/0052043 A1 | 3/2011 | Hyung et al. | |
| 2011/0093306 A1 | 4/2011 | Nielsen et al. | |
| 2011/0137527 A1 | 6/2011 | Simon et al. | |
| 2011/0168774 A1 | 7/2011 | Magal | |
| 2011/0172875 A1 | 7/2011 | Gibbs | |
| 2011/0216063 A1 | 9/2011 | Hayes | |
| 2011/0242286 A1 | 10/2011 | Pace et al. | |
| 2011/0246503 A1* | 10/2011 | Bender | G06F 16/258 707/769 |
| 2011/0254840 A1 | 10/2011 | Halstead | |
| 2011/0286007 A1 | 11/2011 | Pangrazio et al. | |
| 2011/0288816 A1 | 11/2011 | Thierman | |
| 2011/0310088 A1 | 12/2011 | Adabala et al. | |
| 2012/0017028 A1* | 1/2012 | Tsirkin | G06F 12/10 711/6 |
| 2012/0019393 A1 | 1/2012 | Wolinsky et al. | |
| 2012/0022913 A1 | 1/2012 | VolKmann et al. | |
| 2012/0051730 A1 | 3/2012 | Cote et al. | |
| 2012/0069051 A1 | 3/2012 | Hagbi et al. | |
| 2012/0075342 A1 | 3/2012 | Choubassi et al. | |
| 2012/0133639 A1 | 5/2012 | Kopf et al. | |
| 2012/0307108 A1 | 6/2012 | Forutanpour | |
| 2012/0169530 A1 | 7/2012 | Padmanabhan et al. | |
| 2012/0179621 A1 | 7/2012 | Moir et al. | |
| 2012/0185112 A1 | 7/2012 | Sung et al. | |
| 2012/0194644 A1 | 8/2012 | Newcombe et al. | |
| 2012/0197464 A1 | 8/2012 | Wang et al. | |
| 2012/0201466 A1 | 8/2012 | Funayama et al. | |
| 2012/0209553 A1 | 8/2012 | Doytchinov et al. | |
| 2012/0236119 A1 | 9/2012 | Rhee et al. | |
| 2012/0249802 A1 | 10/2012 | Taylor | |
| 2012/0250978 A1 | 10/2012 | Taylor | |
| 2012/0269383 A1 | 10/2012 | Bobbitt et al. | |
| 2012/0287249 A1 | 11/2012 | Choo et al. | |
| 2012/0323620 A1 | 12/2012 | Hofman et al. | |
| 2013/0030700 A1 | 1/2013 | Miller et al. | |
| 2013/0090881 A1 | 4/2013 | Janardhanan et al. | |
| 2013/0119138 A1 | 5/2013 | Winkel | |
| 2013/0132913 A1 | 5/2013 | Fu et al. | |
| 2013/0134178 A1 | 5/2013 | Lu | |
| 2013/0138246 A1 | 5/2013 | Gutmann et al. | |
| 2013/0142421 A1 | 6/2013 | Silver et al. | |
| 2013/0144565 A1 | 6/2013 | Miller et al. | |
| 2013/0154802 A1 | 6/2013 | O'Haire et al. | |
| 2013/0156292 A1 | 6/2013 | Chang et al. | |
| 2013/0162806 A1 | 6/2013 | Ding et al. | |
| 2013/0176398 A1 | 7/2013 | Bonner et al. | |
| 2013/0178227 A1 | 7/2013 | Vartanian et al. | |
| 2013/0182114 A1 | 7/2013 | Zhang et al. | |
| 2013/0226344 A1 | 8/2013 | Wong et al. | |
| 2013/0228620 A1 | 9/2013 | Ahem et al. | |
| 2013/0232039 A1* | 9/2013 | Jackson | G06Q 10/087 705/28 |
| 2013/0235165 A1 | 9/2013 | Gharib et al. | |
| 2013/0235206 A1* | 9/2013 | Smith | G06Q 10/087 348/150 |
| 2013/0236089 A1 | 9/2013 | Litvak et al. | |
| 2013/0278631 A1 | 10/2013 | Border et al. | |
| 2013/0299306 A1 | 11/2013 | Jiang et al. | |
| 2013/0299313 A1 | 11/2013 | Baek, IV et al. | |

(56) References Cited

U.S. PATENT DOCUMENTS

| | | |
|---|---|---|
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0006229 A1* | 1/2014 | Birch .................. G06Q 10/087 705/28 |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0082316 A1* | 3/2014 | Erdmann .............. G06F 3/0605 711/170 |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1* | 9/2014 | Field-Darragh ..... H04B 5/0062 705/28 |
| 2014/0300637 A1 | 10/2014 | Fan et al. |
| 2014/0316875 A1* | 10/2014 | Tkachenko ............ G06Q 20/18 705/14.25 |
| 2014/0330835 A1* | 11/2014 | Boyer .................... G06F 16/10 707/741 |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0088618 A1 | 3/2015 | Basir et al. |
| 2015/0088701 A1* | 3/2015 | Desmarais ........... G06Q 10/087 705/28 |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1* | 6/2015 | Pettyjohn ............ G06F 3/04812 705/14.49 |
| 2015/0181198 A1 | 6/2015 | Baele et al. |
| 2015/0212521 A1 | 7/2015 | Pack et al. |
| 2015/0235157 A1* | 8/2015 | Avegliano ........ G06Q 10/06315 705/7.25 |
| 2015/0245358 A1 | 8/2015 | Schmidt |
| 2015/0262116 A1* | 9/2015 | Katircioglu ........ G06K 9/00771 705/28 |
| 2015/0279035 A1 | 10/2015 | Wolski et al. |
| 2015/0298317 A1 | 10/2015 | Wang et al. |
| 2015/0310601 A1* | 10/2015 | Rodriguez ........... G07G 1/0072 348/150 |
| 2015/0332368 A1* | 11/2015 | Vartiainen ........... G06F 16/9535 705/26.61 |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0365660 A1* | 12/2015 | Wu ..................... G05D 1/0234 348/158 |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1* | 9/2016 | Scudillo ................ G06Q 30/06 705/14.58 |
| 2016/0253844 A1 | 9/2016 | Petrovskaya et al. |
| 2016/0260054 A1* | 9/2016 | High .................... G06K 9/18 |
| 2016/0271795 A1 | 9/2016 | Vicenti |
| 2016/0313133 A1 | 10/2016 | Zeng et al. |
| 2016/0328618 A1 | 11/2016 | Patel et al. |
| 2016/0328767 A1* | 11/2016 | Bonner ............. G06K 7/10861 |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1* | 2/2017 | Rizzolo ................. G06K 9/183 |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0109940 A1 | 4/2017 | Guo et al. |
| 2017/0147966 A1* | 5/2017 | Aversa ................. G06Q 10/087 |
| 2017/0150129 A1 | 5/2017 | Pangrazio |
| 2017/0178060 A1* | 6/2017 | Schwartz ............. G06K 9/6267 |
| 2017/0193434 A1* | 7/2017 | Shah ................... G06K 9/00664 |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1* | 9/2017 | Venable ............... G06Q 10/087 |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1* | 10/2017 | Skaff .................... G06K 9/3216 |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0046655 A1* | 2/2018 | Ward ................... G06F 16/2455 |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1* | 3/2018 | Mascorro Medina ...................... G06Q 10/087 |
| 2018/0089613 A1* | 3/2018 | Chen .................... G06T 7/0008 |
| 2018/0101813 A1 | 4/2018 | Paat et al. |
| 2018/0108134 A1* | 4/2018 | Venable ................ G06T 7/521 |
| 2018/0114183 A1 | 4/2018 | Howell |
| 2018/0130011 A1 | 5/2018 | Jacobsson |
| 2018/0143003 A1 | 5/2018 | Clayton et al. |
| 2018/0174325 A1 | 6/2018 | Fu et al. |

(56) References Cited

U.S. PATENT DOCUMENTS

| | | |
|---|---|---|
| 2018/0201423 A1 | 7/2018 | Drzewiecki et al. |
| 2018/0204111 A1 | 7/2018 | Zadeh et al. |
| 2018/0251253 A1 | 9/2018 | Taira et al. |
| 2018/0276596 A1* | 9/2018 | Murthy .............. G06K 9/00771 |
| 2018/0281191 A1 | 10/2018 | Sinyavskiy et al. |
| 2018/0293442 A1 | 10/2018 | Fridental et al. |
| 2018/0306958 A1* | 10/2018 | Goss ........................ A47F 10/02 |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0370727 A1 | 12/2018 | Hance et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0073627 A1* | 3/2019 | Nakdimon ......... G06K 7/10425 |
| 2019/0077015 A1 | 3/2019 | Shibasaki et al. |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0180150 A1 | 6/2019 | Taylor et al. |
| 2019/0197728 A1 | 6/2019 | Yamao |
| 2019/0236530 A1 | 8/2019 | Cantrell et al. |
| 2019/0304132 A1 | 10/2019 | Yoda et al. |
| 2019/0392212 A1 | 12/2019 | Sawhney et al. |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| JP | 2014170431 A | 9/2014 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

"Fair Billing with Automatic Dimensioning" pp. 1-4, undated, Copyright Mettler-Toledo International Inc.

"Plane Detection in Point Cloud Data" dated Jan. 25, 2010 by Michael Ying Yang and Wolfgang Forstner, Technical Report 1, 2010, University of Bonn.

"Swift Dimension" Trademark Omniplanar, Copyright 2014.

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

Batalin et al., "Mobile robot navigation using a sensor network," IEEE, International Conference on robotics and automation, Apr. 26, May 1, 2004, pp. 636-641.

Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.

Biswas et al. "Depth Camera Based Indoor Mobile Robot Localization and Navigation" Robotics and Automation (ICRA), 2012 IEEE International Conference on IEEE, 2012.

Bohm, Multi-Image Fusion for Occlusion-Free Façade Texturing, International Archives of the Photogrammetry, Remote Sensing and Spatial Information Sciences, pp. 867-872 (Jan. 2004).

Bristow et al., "A Survey of Iterative Learning Control", IEEE Control Systems, Jun. 2006, pp. 96-114.

Buenaposada et al. "Realtime tracking and estimation of plane pose" Proceedings of the ICPR (Aug. 2002) vol. II, IEEE pp. 697-700.

Carreira et al., "Enhanced PCA-based localization using depth maps with missing data," IEEE, pp. 1-8, Apr. 24, 2013.

Chen et al. "Improving Octree-Based Occupancy Maps Using Environment Sparsity with Application to Aerial Robot Navigation" Robotics and Automation (ICRA), 2017 IEEE.

Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).

Cook et al., "Distributed Ray Tracing ACM SIGGRAPH Computer Graphics", vol. 18, No. 3, ACM pp. 137-145, 1984.

Datta, A., et al. "Accurate camera calibration using iterative refinement of control points," in Computer Vision Workshops (ICCV Workshops), 2009.

Deschaud, et al., "A Fast and Accurate Place Detection algoritm for large noisy point clouds using filtered normals and voxel growing," 3DPVT, May 2010, Paris, France. [hal-01097361].

Douillard, Bertrand, et al. "On the segmentation of 3D LIDAR point clouds." Robotics and Automation (ICRA), 2011 IEEE International Conference on IEEE, 2011.

Dubois, M., et al., A comparison of geometric and energy-based point cloud semantic segmentation methods, European Conference on Mobile Robots (ECMR), p. 88-93, Sep. 25-27, 2013.

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

Notice of allowance for U.S. Appl. No. 15/211,103 dated Apr. 5, 2017.

Olson, Clark F., etal. "Wide-Baseline Stereo Vision for terrain Mapping" in Machine Vision and Applications, Aug. 2010.

Oriolo et al., "An iterative learning controller for nonholonomic mobile Robots", the international Journal of Robotics Research, Aug. 1997, pp. 954-970.

Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176.

Park et al., "Autonomous mobile robot navigation using passive rfid in indoor environment," IEEE, Transactions on industrial electronics, vol. 56, issue 7, pp. 2366-2373 (Jul. 2009).

(56) References Cited

OTHER PUBLICATIONS

Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks," in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php.
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Senthilkumaran, et al., "Edge Detection Techniques for Image Segmentation—A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint," International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference On, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-as-Possible Image Stitching with Moving DLT", 2013 Computer Vision Foundation, pp. 2339-2346.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds," IEEE, 2016 Conference on Computer vision and Pattern recognition (CVPR), Jun. 27-30, 2016, pp. 1-9.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2019/025859 dated Jul. 3, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/US2019/064020 dated Feb. 19, 2020.
International Search Report and Written Opinion for International Patent Application No. PCT/US2013/053212 dated Dec. 1, 2014.
International Search Report and Written Opinion for International Patent Application No. PCT/US2013/070996 dated Apr. 2, 2014.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
Jadhav et al. "Survey on Spatial Domain dynamic template matching technique for scanning linear barcode," International Journal of science and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.

(56) References Cited

OTHER PUBLICATIONS

Kang et al., "Kinematic Path-Tracking of Mobile Robot Using Iterative learning Control", Journal of Robotic Systems, 2005, pp. 111-121.

Kay et al. "Ray Tracing Complex Scenes." ACM SIGGRAPH Computer Graphics, vol. 20, No. 4, ACM, pp. 269-278, 1986.

Kelly et al., "Reactive Nonholonomic Trajectory Generation via Parametric Optimal Control", International Journal of Robotics Research, vol. 22, No. 7-8, pp. 583-601 (Jul. 30, 2013).

Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.

Lecking et al: "Localization in a wide range of industrial environments using relative 3D ceiling features", IEEE, pp. 333-337 (Sep. 15, 2008).

Lee et al. "Statistically Optimized Sampling for Distributed Ray Tracing." ACM SIGGRAPH Computer Graphics, vol. 19, No. 3, ACM, pp. 61-67, 1985.

Li et al., "An improved RANSAC for 3D Point cloud plane segmentation based on normal distribution transformation cells," Remote sensing, V9: 433, pp. 1-16 (2017).

Likhachev, Maxim, and Dave Ferguson. "Planning Long dynamically feasible maneuvers for autonomous vehicles." The international journal of Robotics Reasearch 28.8 (2009): 933-945. (Year:2009).

Marder-Eppstein et al., "The Office Marathon: robust navigation in an indoor office environment," IEEE, 2010 International conference on robotics and automation, May 3-7, 2010, pp. 300-307.

McNaughton, Matthew, et al. "Motion planning for autonomous driving with a conformal spatiotemporal lattice." Robotics and Automation (ICRA), 2011 IEEE International Conference on. IEEE, 2011. (Year: 2011).

Mitra et al., "Estimating surface normals in noisy point cloud data," International Journal of Computational geometry & applications, Jun. 8-10, 2003, pp. 322-328.

N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.

Ni et al., "Edge Detection and Feature Line Tracing in 3D-Point Clouds by Analyzing Geometric Properties of Neighborhoods," Remote Sensing, V8 I9, pp. 1-20 (2016).

Norriof et al., "Experimental comparison of some classical iterative learning control algorithms", IEEE Transactions on Robotics and Automation, Jun. 2002, pp. 636-641.

Notice of allowance for U.S. Appl. No. 13/568,175 dated Sep. 23, 2014.

Notice of allowance for U.S. Appl. No. 13/693,503 dated Mar. 11, 2016.

Notice of allowance for U.S. Appl. No. 14/068,495 dated Apr. 25, 2016.

Notice of allowance for U.S. Appl. No. 14/518,091 dated Apr. 12, 2017.

\* cited by examiner

PRODUCT STATUS DETECTION SYSTEM

CROSS-REFERENCE TO RELATED APPLICATIONS

This application claims the benefit of priority to U.S. Provisional Application No. 62/492,670, filed May 1, 2017, by Perrella et al., entitled "Product Status Detection System," which is incorporated herein by reference in its entirety.

BACKGROUND

Environments in which objects are managed may be complex and fluid. For example, a retail environment may include objects such as products for purchase, a distribution environment may include objects such as parcels or pallets, a manufacturing environment may include objects such as components or assemblies, a healthcare environment may include objects such as medications or medical devices. A given environment may contain a wide variety of objects with different attributes (size, shape, price and the like). Further, the placement and quantity of the objects in the environment may change frequently. Still further, imaging conditions such as lighting may vary either over time or at different locations in the environment. These factors may reduce the accuracy with which information concerning the objects may be collected within the environment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
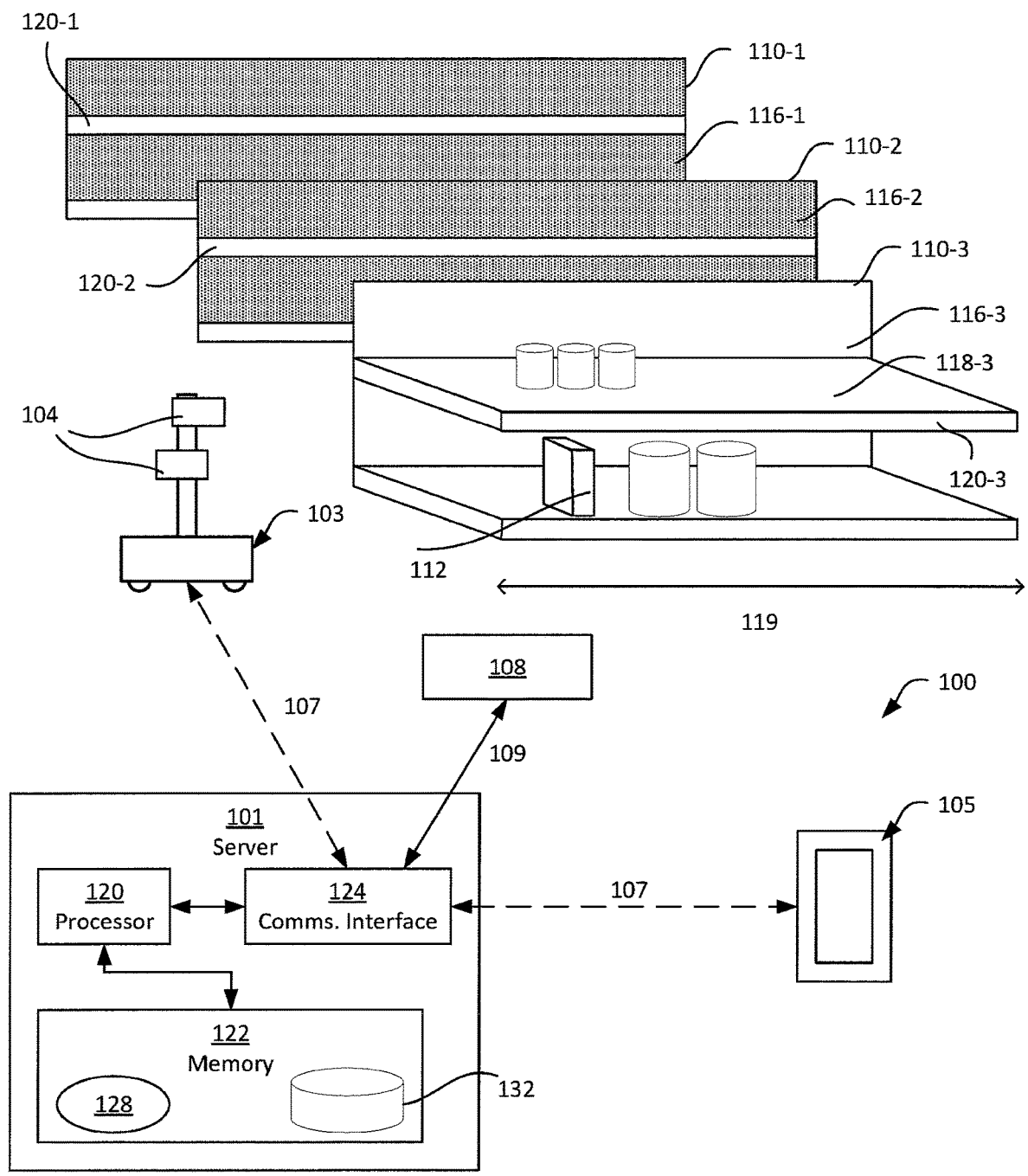
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Environments such as warehouses, distribution centers, fulfilment and sortation centers, cross-docking facilities, manufacturing plants, assembly lines, retail locations (e.g. grocery stores, general merchandise stores, department stores, convenience stores, restaurants), health care facilities and the like typically contain a wide variety of products. Each such product may have certain associated characteristics, such as size, dimension, color, serial number, or weight. Certain environments may associate one or more products into a stock keeping unit (SKU) with similar features, for instance multiple shirts with an identical fashion but available in sizes of small, medium, large, or extra-large may have the same SKU. Certain environments may assign attributes to products or to SKUs to better manage the products, such as a cost, price, batch, date code, expiration date, components and/or ingredients, packaging, tracking number, order number, shipping number, storage requirements, or the like. Within the environment, products may be arranged in stocking areas: products may be supported on shelves for selection and purchase by customers or for picking by employees, vendors, or contractors; products may be placed in a particular floor zone; set on a pallet; or collected in a bin. Shelves may be arranged in a shelving module with a single module base, but multiple shelf sections, often with a module back. A shelving module may have a door, particularly if the products are refrigerated. Sometimes shelving modules are placed side to side so that individual shelf sections align, creating a longer shelf, other times a shelf is only a single shelf section. Sometimes shelving modules are placed face to face with an aisle between them to facilitate shopping by customers, picking by employees, or stocking by vendors.

The set of products within a stocking area varies over time, as products are stocked, removed and, in some cases replaced by, customers or employees. Products that have been partially or fully depleted typically require restocking, and products that have been incorrectly replaced (referred to as "plugs") typically require relocation to the correct stocking area. More specifically, "spreads" are classified as a single product distributed across adjacent shelf locations where a different product (SKU) is supposed to be located. In addition, products may be present on shelves but incorrectly oriented, or pushed back from a shelf edge further than a predefined target distance. Of course, objects other than products may be placed in a stocking area or on a shelf as well, such as bags, packing materials, mobile computers, scanners, merchandising materials, cleaning supplies, kiosks, signage, etc.

Further, products in such environments are often associated with labels placed on a shelf edge, a peg, racking, displays or the products themselves. The labels generally indicate a price of the associated product or SKU, and may include other information, such as the name, a manufacturer, SKU, color, dimensions, size, EAN, license information, price, promotional message, nutritional information, storage requirements, safety information, date information, and the like. The information may be in text, color, graphics, digital or analog watermarking, or barcoded, and may also be associated with data stored in circuitry within the label, such as an electronic shelf label or RFID label. The labels are subject to physical disturbance (e.g. being knocked off a shelf edge), and may also be misplaced in the environment (e.g. adjacent to the incorrect products or SKUs). Further, the label price displayed on a label may not reflect a reference price associated with the relevant product in a price book employed by point-of-sale systems.

Detecting product status issues, such as restocking or plug/spread issues, product orientation issues, or labeling issues are conventionally performed by human employees, via visual assessment of the stock areas and shelves, manual barcode scanning (e.g. to compare prices displayed on labels to reference prices), and the like. This form of detection is labor-intensive and therefore costly, as well as error-prone.

Attempts to automate the detection of product status issues are complicated by the layout and dynamic nature of the environment in which an autonomous data capture system is required to operate. Areas of several thousand square feet or more, subdivided into a number of individual aisles, may need to be inspected for issues. Digital images of the shelves vary in quality depending on the available lighting, the presence of visual obstructions, and the like. The breadth of products present on the shelves and the variations in their positioning on the shelves reduces the accuracy of machine-generated status detection.

Examples disclosed herein are directed to a product status detection system comprising: a mobile automation apparatus having sensors configured to capture data representing a shelf supporting products, responsive to data capture instructions received at the mobile automation apparatus; a server in communication with the mobile automation apparatus via a network, including: a mobile apparatus controller configured to generate data capture instructions and transmit the data capture instructions to the mobile automation apparatus; a repository configured to store captured data received via the network from the mobile automation apparatus; a primary object generator configured to retrieve the captured data and generate a plurality of primary data objects from the captured data, each of the primary data objects including a location in a common frame of reference; a secondary object generator configured to generate a set of secondary data objects based on the primary data objects, and to store the secondary data objects in the repository; a detector configured to compare the secondary data objects with reference data obtained from the repository or other data sources, and to generate mismatch records identifying mismatches between the reference data and the secondary data objects; and an alert generator configured to select a subset of the mismatch records, generate a status alert corresponding to the subset of mismatch records, and transmit the status alert via the network; and a client computing device configured to receive the status alert via the network and display the status alert.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points. In other examples, the server, the client device 105, or both, are located outside the retail environment, and the links 107 therefore include wide-area networks such as the Internet, mobile networks, and the like. As will be described in greater detail below, the system 100 also includes a dock 108 for the apparatus 103. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 includes computing devices such as a desktop computer, a laptop computer, another server, a kiosk, a monitor, or other suitable device. The system 100 can include a plurality of client devices 105, each in communication with the server 101 via respective links 107.

The system 100 is deployed, in the illustrated example, in a retail environment including a plurality of shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 118-3 as illustrated in FIG. 1) extending from the shelf back 116 to a shelf edge 120-1, 120-2, 120-3. The shelf modules may also, in some examples, including other support structures, such as pegs, commercial racking, hangers and the like. The shelf modules 110 are typically arranged in a plurality of aisles, each of which includes a plurality of modules aligned end-to-end. More specifically, the apparatus 103 is deployed within the retail environment, and communicates with the server 101 (via the link 107) to navigate, autonomously or partially autonomously, the length 119 of at least a portion of the shelves 110. The apparatus 103 is equipped with a plurality of navigation and data capture sensors 104, such as image sensors (e.g. one or more digital cameras) and depth sensors (e.g. one or more Light Detection and Ranging (LIDAR) sensors), and is further configured to employ the sensors to capture shelf data. In the present example, the apparatus 103 is configured to capture a series of digital images of the shelves 110, as well as a series of depth measurements, each describing the distance and direction between the apparatus 103 and one or more points on a shelf 110, such as the shelf itself or the product disposed on the shelf.

The server 101 includes a special purpose imaging controller, such as a processor 120, specifically designed to control the mobile automation apparatus 103 to capture data, obtain the captured data via a communications interface 124 and store the captured data in a repository 132 in a memory 122. The server 101 is further configured to perform various post-processing operations on the captured data and to detect the status of the products 112 on the shelves 110. When certain status indicators are detected by the processor 120, the server 101 is also configured to transmit status notifications (e.g. notifications indicating that products are out-of-stock, low stock or misplaced) to the mobile device 105. The post-processing of captured data and the detection of status and generation of notifications by the server 101 will be discussed below in greater detail.

The processor 120 is interconnected with a non-transitory computer readable storage medium, such as the above-mentioned memory 122, having stored thereon computer readable instructions for executing control of the apparatus 103 to capture data, as well as the above-mentioned post-processing functionality, as discussed in further detail below. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In an embodiment, the processor 120, further includes one or more central processing units (CPUs) and/or graphics processing units (GPUs). In an embodiment, a specially designed integrated circuit, such as a Field Programmable Gate Array (FPGA), is designed to perform the object status detection discussed herein, either alternatively or in addition to the imaging controller/processor 120 and memory 122. As those of skill in the art will realize, the mobile automation apparatus 103 also includes one or more controllers or processors and/or FPGAs, in communication with the controller 120, specifically configured to control navigational and/or data capture aspects of the apparatus 103. The client device 100 also includes one or more controllers or processors and/or FPGAs, in communication with the controller 120, specifically configured to process (e.g. to display) notifications received from the server 101.

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local and wide area networks are implemented within the retail environment via the deployment of one or more wireless access points and/or wide area network communication interfaces. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the control application 128 or subcomponents thereof, the processor 120 is configured to implement various functionalities. The processor 120, as configured via the execution of the control application 128, is also referred to herein as the controller 120. As will now be apparent, some or all of the functionality implemented by the controller 120 described below may also be performed by preconfigured hardware elements (e.g. one or more Application-Specific Integrated Circuits (ASICs)) rather than by execution of the control application 128 by the processor 120.

In the present example, in particular, the server 101 is configured via the execution of the control application 128 by the processor 120, to control the apparatus 103 to capture shelf data, to obtain the captured shelf data and process the data to detect status information for the products 112, and to generate status notifications.

Figures 2, 2A:
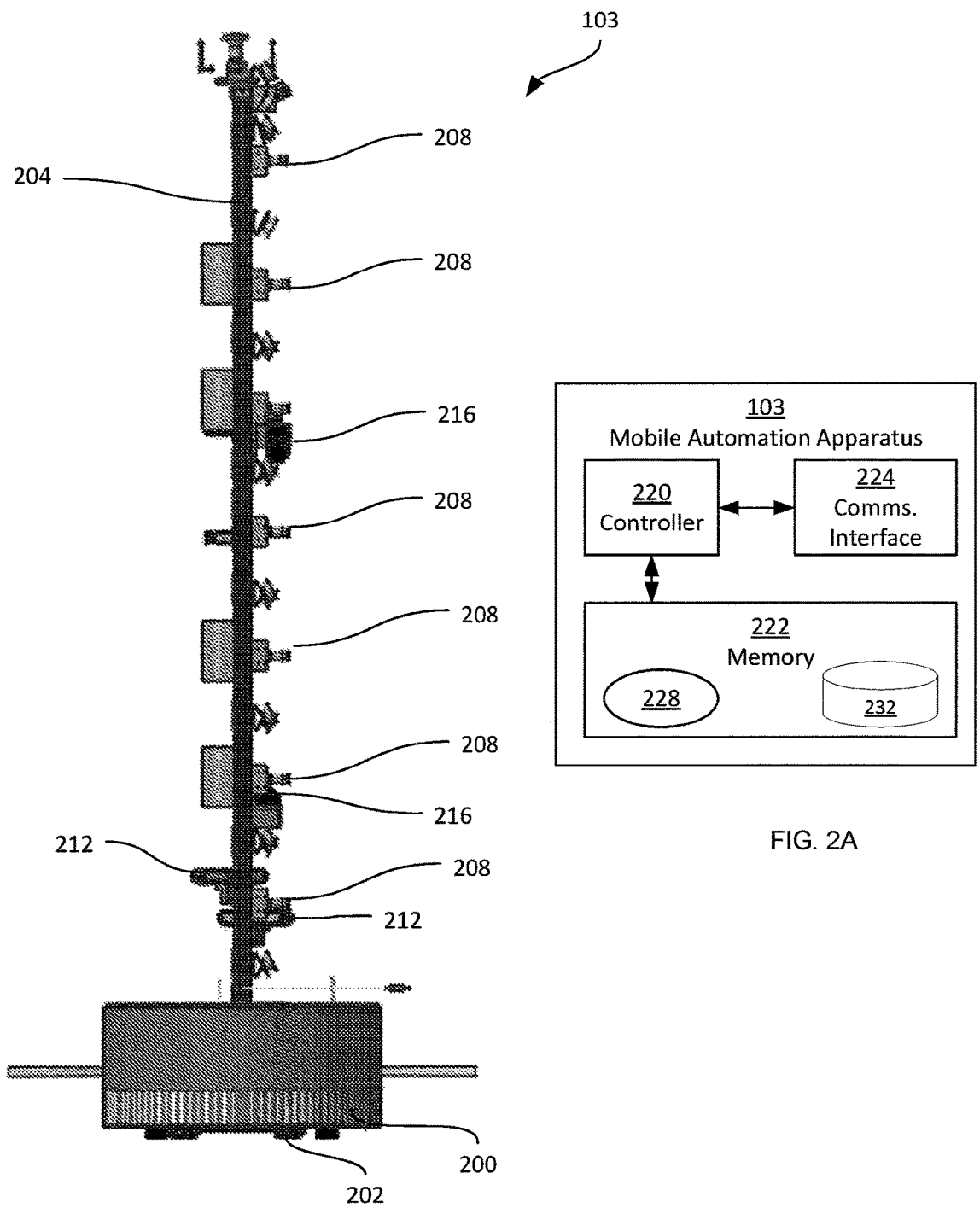
FIG. 2 is a rear elevation view of a mobile automation apparatus in the system of FIG. 1.
FIG. 2A is a block diagram of certain internal components of the mobile automation apparatus in the system of FIG. 1.

Turning now to FIG. 2, before a discussion of the components and operation of the application 128, the apparatus 103 will be described in greater detail. The apparatus 103 includes a chassis 200 containing a locomotive mechanism 202 (e.g. one or more motors driving wheels, tracks or the like). In one embodiment, depicted in FIG. 2A, a controller 220 (for example, a processor, ASIC and/or FPGA) configured to control navigational and/or data capture aspects of the apparatus 103 is also housed within the chassis 200. The controller 220 may control the locomotive mechanism to move the apparatus 103, for example via the execution of computer-readable instructions such as a navigation application 228 stored in a memory 222. The memory 222 may also store a repository 232 containing, for example, a map of the environment in which the apparatus 103 operates, for use during the execution of the application 228. The apparatus 103 may communicate with the server 101 via a communications interface 224, for example to exchange command and control data with the server 101.

The apparatus 103 further includes a sensor mast 204 supported on the chassis 200 and, in the present example, extending upwards from the chassis 200. The mast 204 supports the sensors 104 mentioned earlier. In particular, the sensors 104 include at least one imaging sensor 208, such as a digital camera, as well as at least one depth-sensing sensor 212, such as a 3D digital camera. The apparatus 103 also includes additional depth sensors, such as LIDAR sensors 216, in the present example. The sensors 208, 212, 216 are oriented on the mast 204 such that the fields of view of each sensor face a shelf along which the apparatus 103 is travelling. In other examples, the apparatus 103 includes additional sensors, such as one or more RFID readers, temperature sensors, structured light imaging sensors, and the like.

Figure 3:
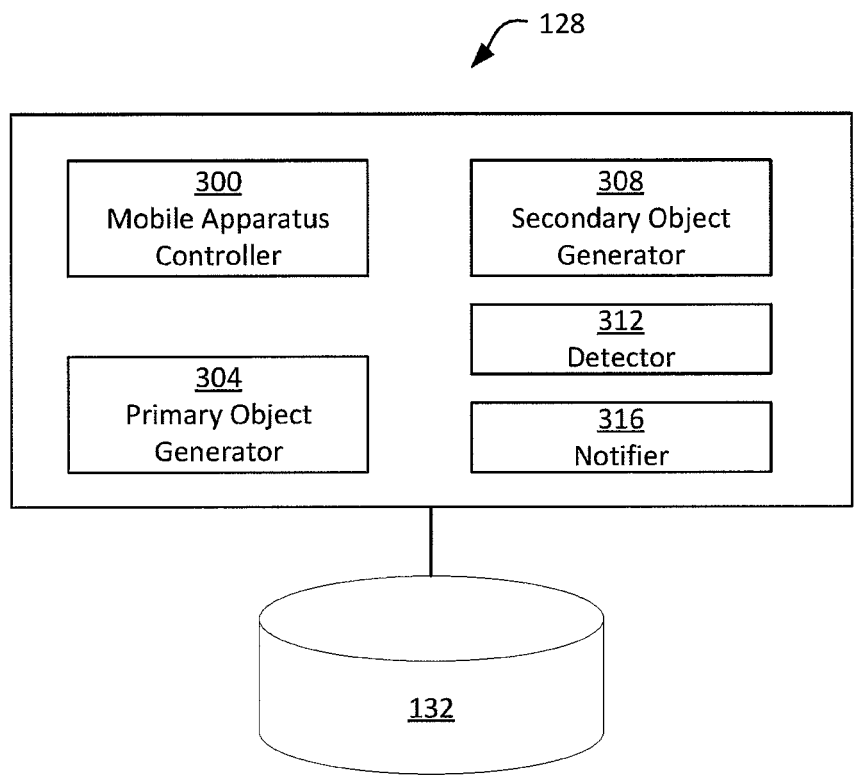
FIG. 3 is a block diagram of certain internal hardware components of the server in the system of FIG. 1.

Turning now to FIG. 3, certain components of the application 128 will be described in greater detail. As will be apparent to those skilled in the art, in other examples the components of the application 128 may be separated into distinct applications, or combined into other sets of components. Some or all of the components illustrated in FIG. 3 may also be implemented as dedicated hardware components, such as one or more ASICs or FPGAs. For example, in one embodiment, to improve reliability and processing speed, at least some of the components of FIG. 3 are programmed directly into the imaging controller 120, which may be an FPGA or an ASIC having circuit and memory configuration specifically designed to optimize image processing and detection of high volume price label image data being received from the mobile automation apparatus 103. In such an embodiment, some or all of the control application 128, discussed below, is an FPGA or an ASIC chip.

The control application 128 includes a mobile apparatus controller 300 configured to generate data capture instructions for the apparatus 103, deliver the data capture instructions to the apparatus 103, and obtain data captured by the apparatus 103 for storage in the repository 132. The control application 128 also includes a primary object generator 304 and a secondary object generator 308 configured to generate primary data objects and secondary data objects, respectively, as will be discussed below in greater detail. Further, the control application 128 includes a detector 312 configured to detect and classify mismatches between the secondary data objects provided by the generator 308 and reference data stored in the repository 132. The control application 128 also includes a notifier 316 configured to generate status notifications—for example, for transmission to the client device 105—based on the mismatches identified by the detector 312.

Figure 4:
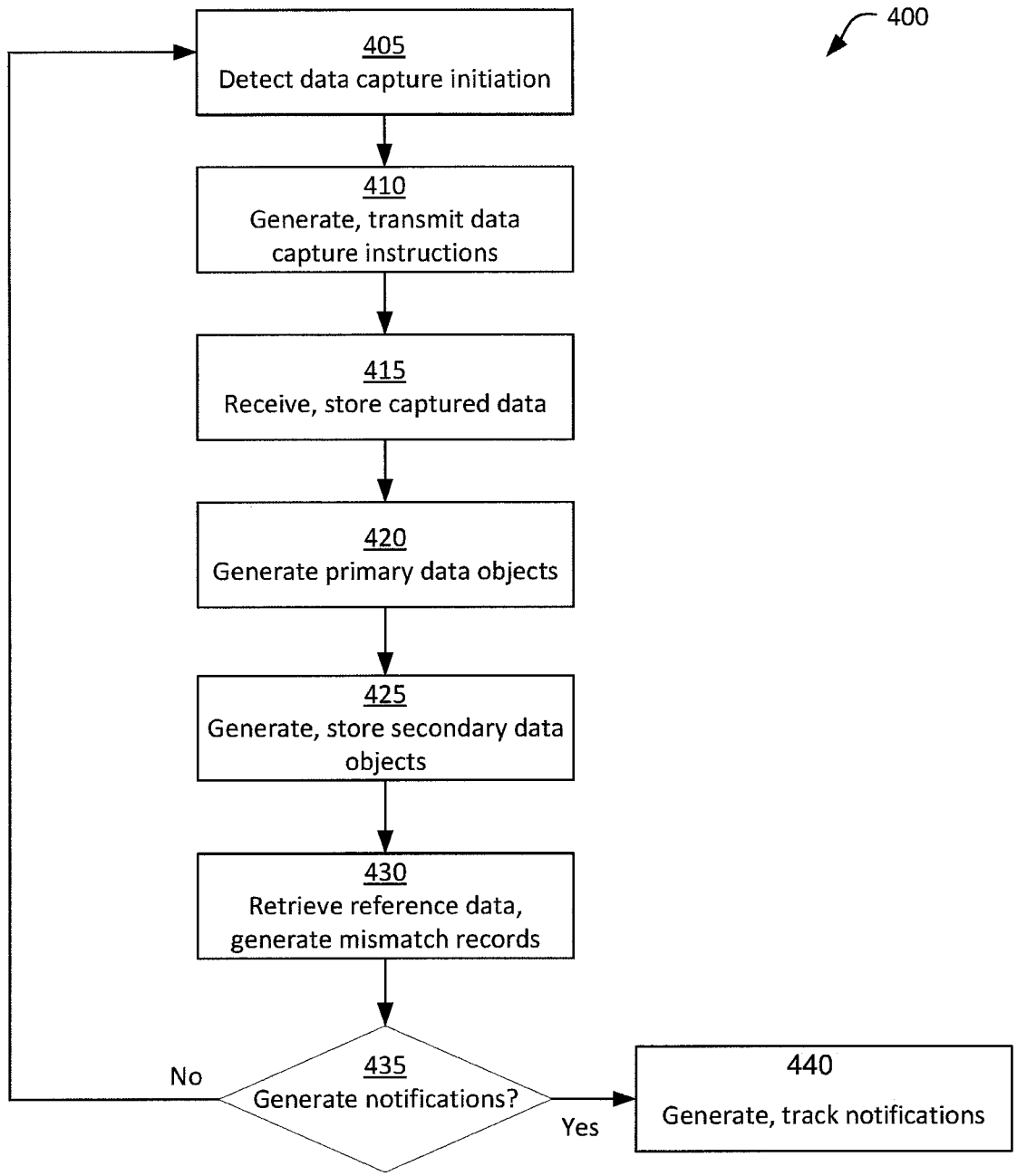
FIG. 4 is a flowchart of a method of product status detection.

The functionality of the control application 128 will now be described in greater detail, with reference to the components illustrated in FIG. 3. Turning to FIG. 4, a method 400 of object status detection is shown. The method 400 will be described in conjunction with its performance on the system 100 as described above.

At block 405, the controller 120, and particularly the mobile apparatus controller 300 of the control application 128, is configured to detect a data capture initiation event. The data capture initiation event, in some examples, is a preconfigured event stored in the repository 132. For example, the repository 132 can contain a schedule of data capture operations, and the apparatus controller 300 is therefore configured, based on a system time maintained by the controller 120, to determine whether the current time matches a scheduled data capture operation. In other examples, the data capture initiation is received at the server 101 (and specifically at the apparatus controller 300) as a request from the client device 105. In some examples, the client device 105 is configured to present on a display a layout of the retail environment and receive a selection of one or more areas of the retail environment (e.g. a selection of the shelves 110) in which to initiate a data capture operation. The client device 105 is configured, responsive to such a selection, to transmit a request to the server 101 via a link 107. The detection at block 405 in such examples is therefore the receipt, at the apparatus controller 300, of the request from the client device 105.

At block 410, having detected a data capture initiation event, the apparatus controller 300 is configured to generate data capture instructions and transmit the data capture instructions to the apparatus 103 for execution. The data capture instructions identify a region within the retail environment to be traversed by the apparatus 103 during the data capture operation. The region is identified in a common frame of reference, such as a predefined coordinate system for the retail environment. In one embodiment, the apparatus 103 is provisioned with a map of the retail environment, and is configured to navigate, with or without additional control data from the server 101, to and within the target region identified by the data capture instructions. As will be apparent to those skilled in the art, various navigational techniques are available for use by the apparatus 103, including the above-mentioned map, as well as path planning operations, odometry and the like. For instance, in one embodiment, as an alternative or in addition to using a predetermined map of the retail environment, the apparatus 103 surveys the 3D map structure of the retail environment using 3D point data generated by one or more of its sensors and uses the surveyed 3D point data for navigation.

The data capture instructions may also specify other parameters for the data capture operation. Such parameters can include a travel speed for the apparatus 103, a frame rate for image capture, a target distance to maintain between the shelves 110 and the sensors 104 (e.g. the cameras 208). In other examples, such parameters are omitted and the apparatus 103 is instead configured to execute the data capture instructions according to an internally programmed set of parameters. In the present example, the apparatus 103 is configured to perform data capture operations travelling at speeds of about 0.3 m/s and with a frame capture rate of between 3 and 5 frames per second. Further, the apparatus 103 in the present example is configured to maintain a distance of about 60 cm between the mast 204 and the shelf 110 being captured. Thus, each image captured depicts a section of a shelf 110 with a width of about 31 cm, and a frame is captured every 6-10 cm of horizontal travel (dependent on the speed of travel). As a result, each position on the shelf 110 is imaged between three and five times during a data capture operation.

Figure 5:
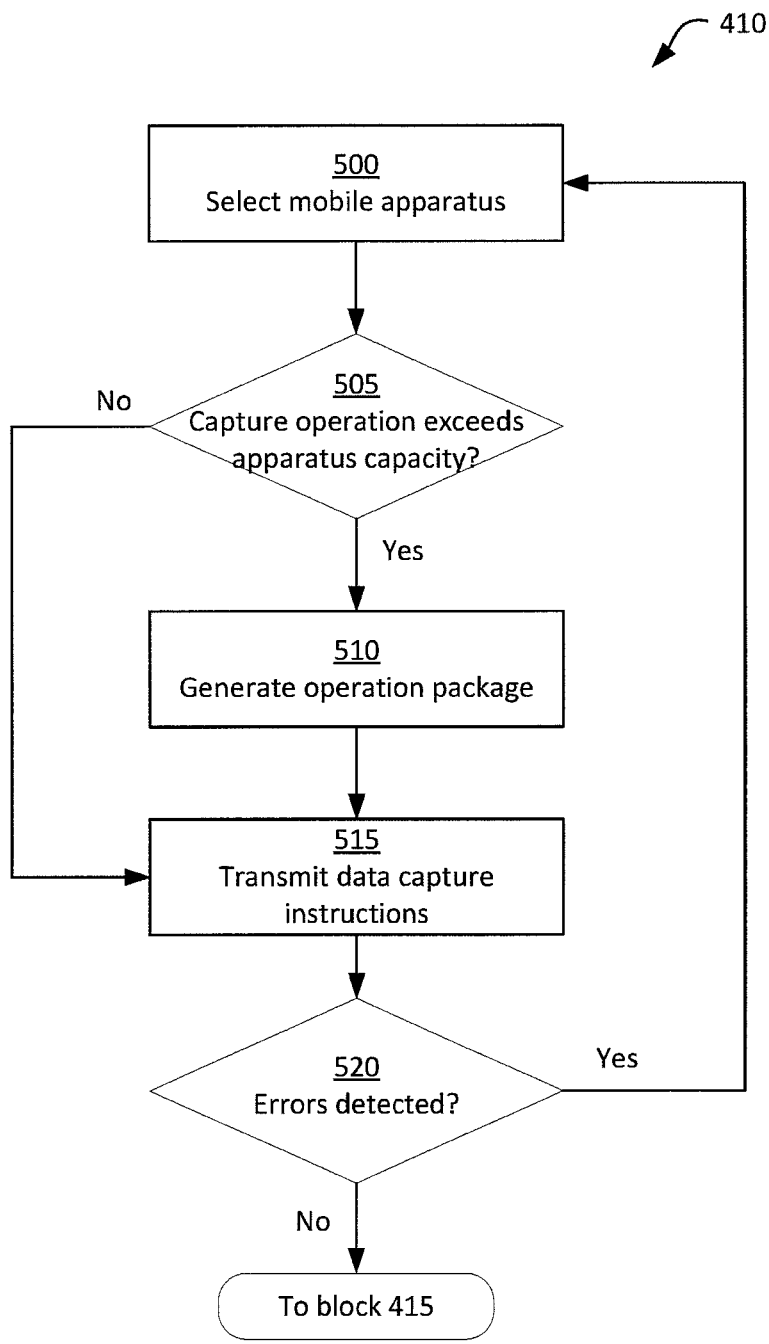
FIG. 5 is a flowchart of a method of generating data capture instructions.

In some environments, the apparatus controller 300 is configured to perform additional functions at block 410 in association with the generation and transmission of data capture instructions. Referring to FIG. 5, a method of performing block 410 is depicted. In particular, at block 500, the apparatus controller 300 is configured to select an apparatus 103 to perform the data capture operation initiated at block 405. When more than one apparatus 103 is deployed in a retail environment, the apparatus controller 300 is configured to store status information corresponding to each apparatus 103. The status information includes the current location of the apparatus 103, a battery (or other energy source, such as fuel) level, whether a data capture operation has already been assigned to the apparatus 103, and the like. At block 500, the apparatus controller 300 is configured to compare the data capture operation parameters (e.g. a region of the environment identified in a data capture request received at block 405) with the apparatus status information, and to select an apparatus 103 to execute the data capture operation. For example, the apparatus controller 300 can be configured to select an apparatus 103 having no current data capture assignment and a minimum threshold battery level.

At block 505, the apparatus controller 300 is configured to determine whether the requested (or otherwise initiated) data capture operation exceeds one or more operational capacities (e.g. range, on-board data storage) of the selected apparatus 103. The required travel distance of the data capture operation is determined based on the region of the retail environment to be traversed for the data capture operation, as mentioned above. If the determination at block 505 is affirmative, the apparatus controller 300 is configured, at block 510, to decompose the data capture operation by generating a package of sub-operations. Each sub-operation can, for example, include an instruction to return to the dock 108 for data transfer, recharging, or both. For example, if the requested data capture operation identifies the shelves 110-1 and 110-2, at block 510 the apparatus controller 300 can be configured to generate a package containing a first sub-operation identifying the shelf 110-1, and a second sub-operation identifying the shelf 110-2.

At block 515, the apparatus controller 300 is configured to transmit the sub-operation package, or the single operation as applicable (e.g. in the event of a negative determination at block 505) to the selected apparatus 103 via the link 107. The apparatus 103 is configured to execute the received data capture operation or sub-operations. In particular, the apparatus 103 is configured to traverse the identified region, capturing image data and depth measurements. The captured data is typically stored in on-board memory of the apparatus 103, for transfer to the server 101 after data capture is complete (e.g. via the dock 108). In other examples, however, the data is transferred to the server 101 wirelessly (e.g. over the link 107) during the data capture operation.

At block 520, the apparatus controller 300 is configured to determine whether any errors have been detected in connection with the data capture instructions sent at block 515. The apparatus 103 is configured to transmit error messages over the link 107 to the server 101 upon detecting any of a variety of operational errors during the execution of data capture instructions. Examples of such operational errors include a low battery, a sensor failure (e.g. the failure of one or more cameras 208), a path planning failure (e.g. resulting in the apparatus 103 becoming stuck) and the like. If the determination at block 520 is affirmative, the apparatus controller 300 is configured to return to block 500 to re-assign the failed data capture operation. In other examples, the apparatus controller 300 is configured to reassign the data capture operation only for certain types of errors. For other errors, the apparatus controller 300 is configured, prior to aborting and reassigning a data capture operation, to provide the apparatus 103 with intermediary instructions, such as returning to the dock 108 for charging, maintenance of the like, before returning to the data capture operation.

Figure 6:
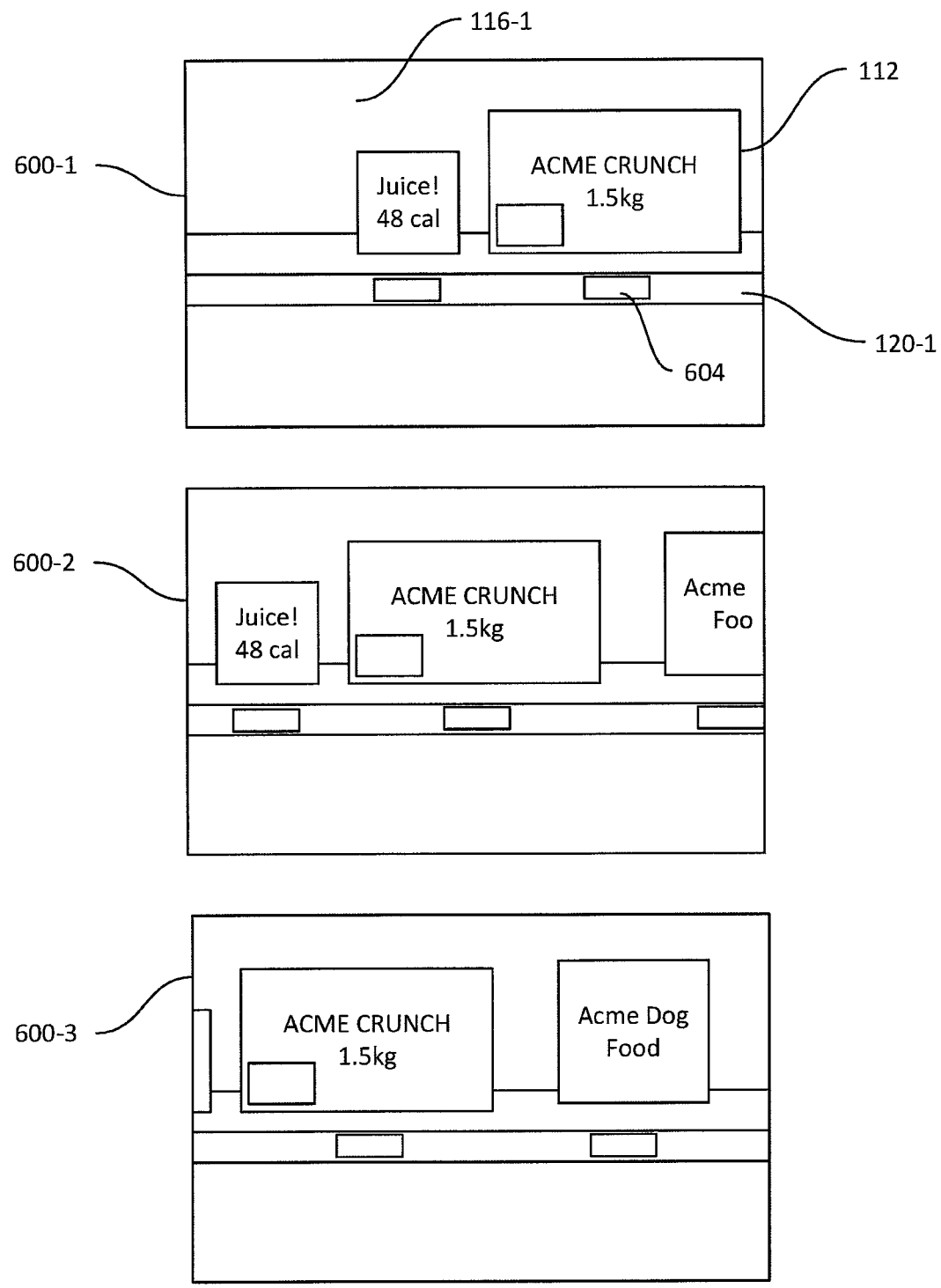
FIG. 6 depicts a set of image data captured by the mobile automation apparatus of FIG. 2.

Returning to FIG. 4, following the transmission of data capture instructions, the apparatus controller 300 is configured to receive and store captured data from the apparatus 103. The captured data, as shown in FIG. 6, includes a plurality of images of at least one shelf 110, as well as depth measurements registered with the images (via calibration data stored by the apparatus 103 and specifying the physical relationships between image sensors 208 and depth sensors 212, 216). Each image is accompanied by a timestamp, as well as a location identifier specifying the location within the above-mentioned common frame of reference at which the image was captured.

The apparatus 103 is configured, in some examples, to perform certain pre-processing operations on the captured data prior to transferring the captured data to the server 101 (e.g. via the dock 108). For example, the apparatus 103 can be configured to downsample the captured images, or portions thereof. More specifically, the apparatus 103 can be configured to perform a barcode-detection operation on the images, and to downsample the regions of each image that do not depict a barcode, while maintaining the original resolution of regions in the images depicting barcodes. In other examples, however, such pre-processing is omitted.

FIG. 6 depicts a set of three images 600-1, 600-2 and 600-3 of the shelf 110-1 received and stored in the repository 132 at block 415. As will be apparent, the images 600 depict overlapping portions of the shelf 110-1. The images 600 depict products 112 supported on the shelf 110-1, as well as the shelf back 116-1, the shelf edge 120-1, and labels 604. The products 112, shelf back 116-1, shelf edge 120-1 and any other objects depicted in the images 600, however, are not identified in a machine-readable manner when the image data is received and stored in the repository 132 at block 415.

At block 420, the primary object generator 304 is configured to generate a plurality of primary objects based on the captured data received at block 415. The primary object generator 304 may include a number of sub-components (not shown) each configured to detect a given type of primary object in the captured data. The objects detected in the captured data, for which primary data objects are generated at block 420, include gaps between products 112 (e.g. generated by a gap detection sub-component), and product indicators corresponding to the products 112 themselves (e.g. generated by a product/item recognition engine). The primary data objects can also include shelf edges (e.g. generated by a shelf structure detection subcomponent), labels (e.g. generated by a label detection subcomponent), and the like.

Each primary data object generated at block 420 includes a location, which may be indicated by a bounding box overlaid on the relevant image, as well as one or more object attributes. In other examples, the bounding box is stored (e.g. as coordinates) separately from the image, or in image metadata. The object attributes include an object type, defining the type of the primary data object. Additional attributes may also be included, such as a confidence value indicating the level of confidence of the relevant sub-component that the primary data object correctly identifies a corresponding object depicted in the image data. Further attributes may also be included in primary data objects dependent on the type of the object.

Figure 7:
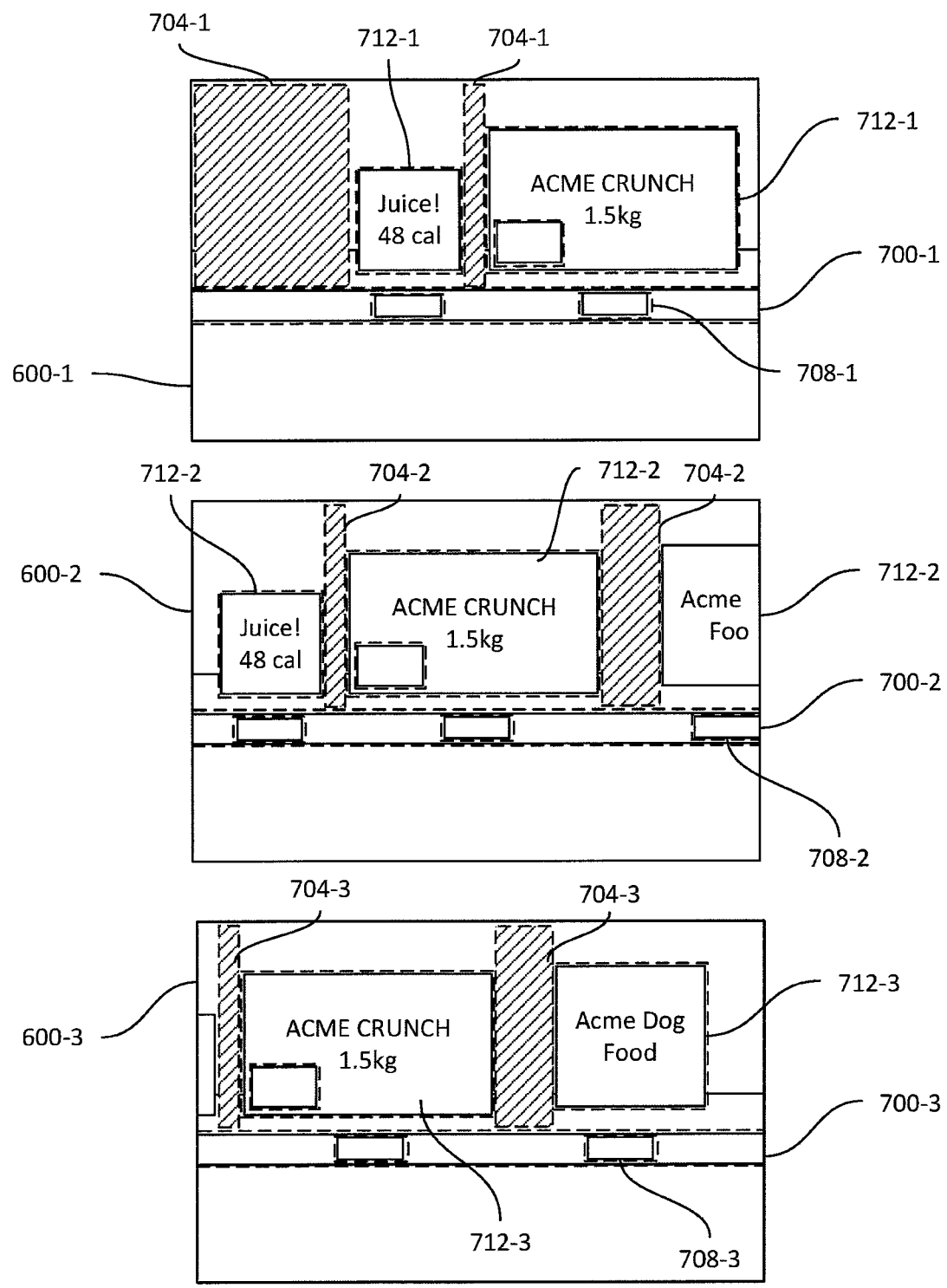
FIG. 7 depicts primary data objects derived from the image data of FIG. 6.

Turning to FIG. 7, various primary objects are illustrated in connection with the images 600, following the performance of block 420. In particular, a shelf edge object 700 is shown in connection with each image 600, and includes a location attribute (illustrated by the bounding boxes in FIG. 7). Also shown in FIG. 7 are gap objects 704, each indicating a gap between products 112 (i.e. a space where the shelf back 116 is visible to the imaging sensors of the apparatus 103). Each gap object includes a location attribute and a type attribute. The primary data objects also include label objects 708, each indicating the presence of a label in the underlying image data, as well as product indicators 712, each indicating the presence of a product 112 in the underlying image data. The label indicators 708 can include, in addition to the location and type attributes, price text string attributes, barcode location (or decoded barcode data) attributes, and the like. The product indicators 712 include location and type attributes, as well as product identifier attributes (e.g. corresponding to a SKU or other identifier of the product depicted in the image).

Returning to FIG. 4, at block 425 the secondary object generator 308 is configured to generate a set of secondary data objects based on the primary data objects, and to store the secondary data objects in the repository 132. The secondary data objects may be generated by the above-mentioned sub-components configured to generate the primary data objects; in other words, in some examples the primary object generator 304 and the secondary object generator 308 are integrated with each other.

As will be apparent from FIG. 7, at least some of the primary data objects are redundant. For example, the gap data objects 704-2 generated from the image 600-2 represent the same actual gaps on the shelf 110 as the gap data objects 704-3 generated from the image 600-3. The secondary object generator 308 is configured to detect and consolidate such redundant sets of primary data objects. The secondary object generator 308 is configured to perform such consolidation by identifying subsets of the primary data objects that have the same object type and that have overlapping locations in the common frame of reference. Having identified such a subset, the secondary object generator 308 is configured to generate a single secondary data object from the subset. Generation of the secondary data object is performed, in some examples, by selecting one of the subset of primary data objects (e.g. the primary data object with the greatest associated confidence level) and discarding the remainder. This may be performed in connection with primary data objects containing price text strings, for example.

In other examples, the secondary object generator 308 is configured to generate the secondary data object by averaging or weighting the subset of primary data objects. In further examples, the secondary data object is generated with a location (e.g. a bounding box) consisting of the common portion of the primary data object locations (that is, the area that is shared by all primary data objects in the subset).

Figure 8A:
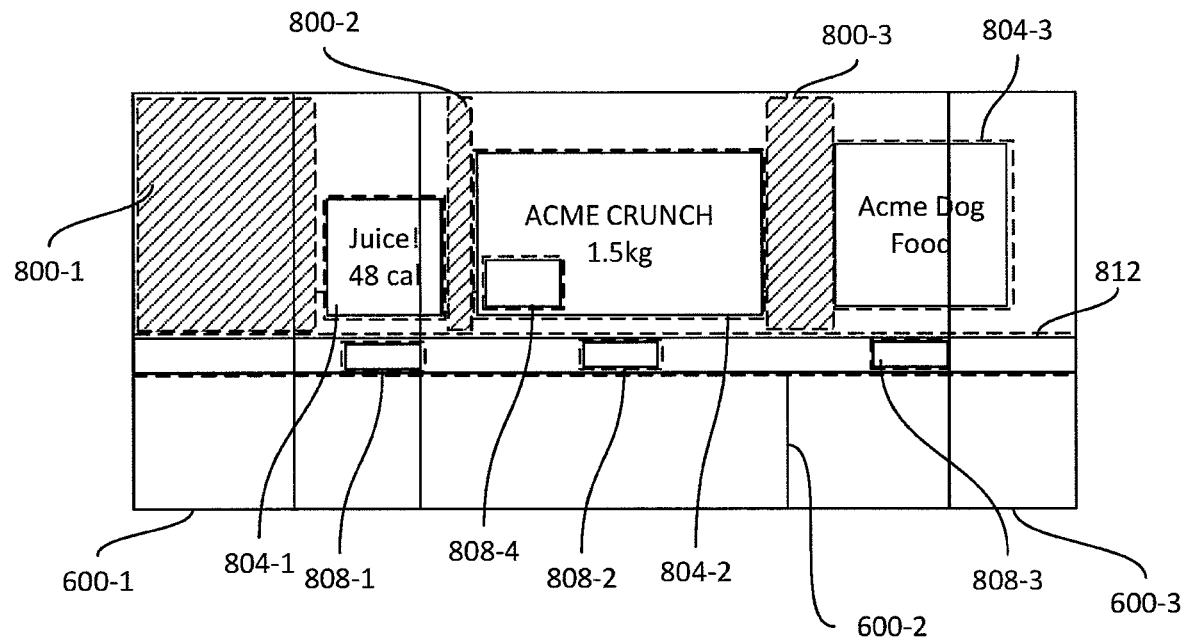
FIG. 8A depicts secondary data objects derived from the primary data objects of FIG. 7

Turning to FIG. 8A, a set of secondary data objects is shown overlaid on the registered images 600-1, 600-2 and 600-3. In particular, three secondary gap objects 800-1, 800-2 and 800-3 are illustrated, consolidated from the six primary gap objects 704 illustrated in FIG. 7. Further, three product indicator data objects 804-1, 804-2 and 804-3 and four label data objects 808-1, 808-2, 808-3 and 808-4 are shown, consolidated from the primary product indicator objects 712 and the primary label objects 708 of FIG. 6, respectively. Further, a secondary shelf edge data object 812 is shown, consolidated from the three primary shelf edge data objects 700 illustrated in FIG. 7.

Figure 8B:
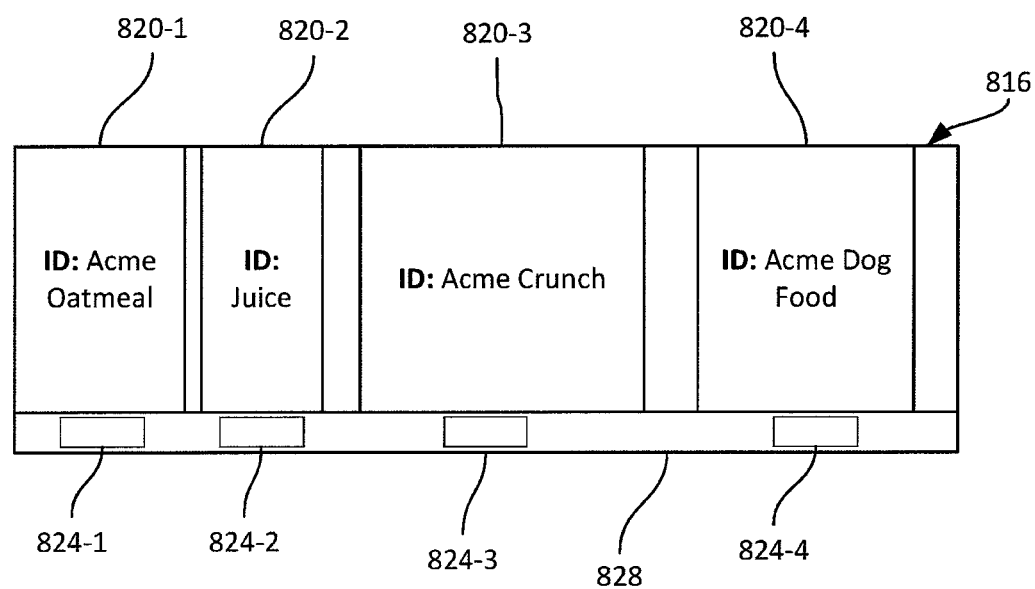
FIG. 8B depicts reference data employed for comparison with the secondary data objects of FIG. 8A.
Figure 9:
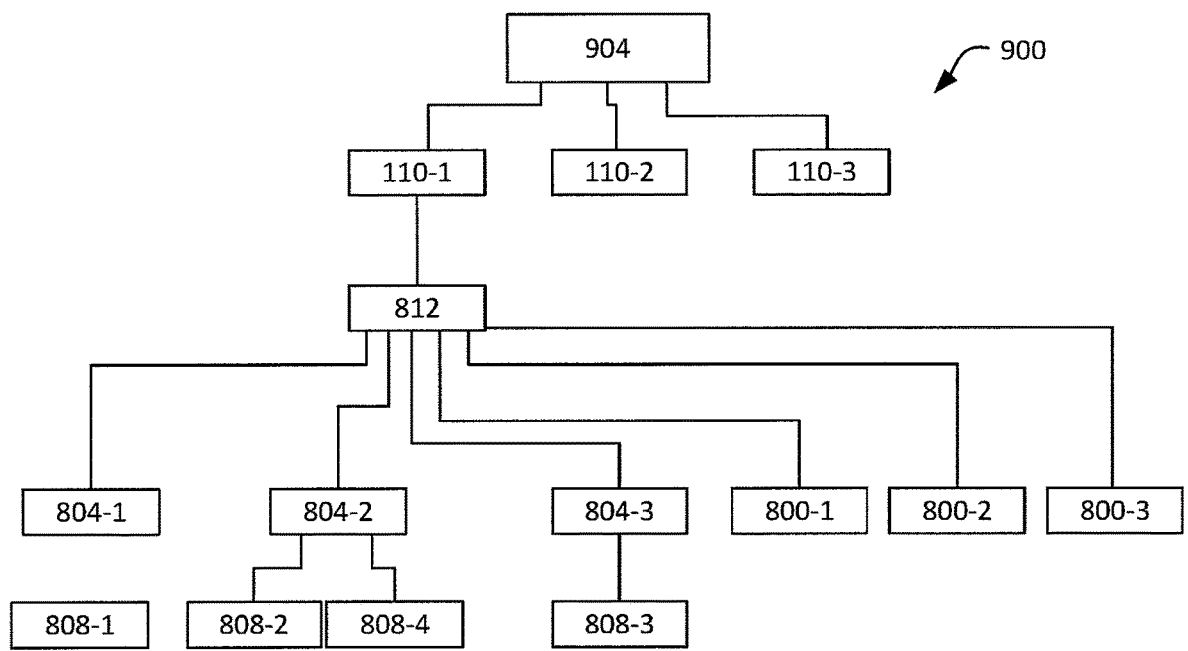
FIG. 9 is a data structure for storing the secondary data objects of FIG. 8A.

The set of secondary data objects generated at block 425 is stored in conjunction with the image data in the repository 132. The storage image data and secondary data objects may also be referred to as a "realogram", representing the current (as of the data capture operation) state of the retail environment. In other examples, the secondary data objects are stored in a data structure associated with the image data (instead of the overlay shown in FIG. 8A), such as a tree structure in which the secondary data objects are assigned to hierarchical nodes. FIG. 9 illustrates an example tree data structure 900, in which a root node 904 corresponds to the retail environment itself, and includes attributes such as a street address, store number, format, and the like. The data structure 900 further includes a first layer of child nodes each corresponding to a shelf module 110. Each shelf module 110, in turn has child nodes corresponding to the shelf structure (e.g. shelf edge secondary data objects), which in turn have child nodes corresponding to products, gaps, labels and the like. The secondary data objects shown in FIG. 8 are arranged in the data structure 900. Additional data capture operations may be performed in order to construct the data structure 900 for the shelf modules 110-2 and 110-3.

Following the generation and storage of the secondary data objects, the primary data objects are discarded in the present example. In other examples, however, the primary data objects are maintained in the repository 132.

Referring again to FIG. 4, at block 430 the detector 312 is configured to retrieve reference data from the repository 132, such as a realogram constructed from a data capture operation performed when the retail environment is at a "full stock" state, or a planogram. FIG. 8B illustrates an example planogram 816 (more specifically a portion of a planogram depicting the same shelf module as the secondary data objects and image data shown in FIG. 8A). The planogram 816 includes reference indicators 820-1, 820-2, 820-3, and 820-4 corresponding to distinct products 112, and each defining reference locations, for example via a bounding box within the common frame of reference. Each indicator 820 also includes a product identifier, such as a text string (as shown in FIG. 8B), a SKU number or the like. Thus, the indicator 820-3 indicates that within the location on the shelf 110-1 corresponding to the bounding box of the indicator 820-3, a box of "Acme Crunch" is expected to be present. The planogram 816 also includes reference indicators 824-1, 824-2, 824-3, and 824-4 corresponding to labels associated with the products 112, and a reference shelf edge indicator 828.

At block 430, the detector 312 is configured to identify mismatches between the reference data and the secondary data objects, and to generate mismatch records corresponding to any detected mismatches. The identification of mismatches is performed by the detector 312 by comparing the reference indicators to the secondary data objects having locations coinciding with the reference indicators. The detector 312 is also configured, in examples in which the secondary data objects are stored in a tree structure such as that shown in FIG. 9, to convert the reference data to a corresponding tree structure prior to performing the comparison. For example, the repository 132 or the detector 312 can store a set of conversion rules, defining node types and expected node attributes with which to convert each reference indicator into a node in a tree structure.

Each mismatch record generated at block 430 identifies a product, label, shelf structure or the like corresponding to the reference indicator that does not match the secondary data objects. The mismatch record also includes a mismatch type and a location of the mismatch (i.e. the location of the reference indicator). The mismatch type indicates, for example, whether a product is missing (i.e. out of stock), partially depleted (i.e. low stock), incorrectly located on the shelf 110 (i.e. a "plug" and/or "spread"), and the like. Other examples of mismatch status indicators include missing labels, incorrect price text on labels, improperly arranged products on the shelves 110 (e.g. a product that is improperly angled relative to the shelf edge). Additional examples of mismatch status will occur to those skilled in the art. Table 1 below illustrates example mismatch records generated at block 430 from the current and reference data shown in FIGS. 8A and 8B.

TABLE 1

Mismatch Records

| Reference ID | Mismatch Type | Location |
| --- | --- | --- |
| Acme Oatmeal | Out of stock | [X, Y, Z] |
| Acme Oatmeal Label | Missing Label | [X, Y, Z] |
| Acme Crunch | Incorrect Label Price | [X, Y, Z] |

At block 435, the notifier 316 is configured whether to generate notifications for one or more of the mismatch records generated by the detector 312 at block 430. The determination at block 435 includes, for example, a determination of whether a previous notification has been generated for a mismatch record having the same type and location within a configurable time period (e.g. up to two hours ago). The determination at block 435 can also be based on the type of each mismatch record. For example, the notifier 316 can be configured to generate notifications only for certain types of mismatches (e.g. out of stock mismatches). In further examples, the notifier 316 is configured to generate notifications only for certain locations in the retail environment at different times of day.

When the determination at block 435 is negative, the performance of the method 400 returns to block 405 for further data capture. When the determination is affirmative, however, the notifier 316, in block 440, is configured to select a subset of the mismatch records for which to generate one or more notifications, and to generate and transmit one or more status notifications to the client device 105. Each status notification indicates, for one or more mismatch records, the relevant label, product or the like (corresponding to the reference identifier in the mismatch record), the mismatch type, and the location of the mismatch. Each status notification also contains, in some examples, an identifier of a client application executing on the client device 105. The application identifier corresponds to one of a plurality of applications executing on the client device 105, and instructs the client device 105 to handle the status notification via that one of the applications. The client device 105 can therefore executed a number of applications, each directed to receiving and resolving different types of status notifications.

The notifier 316 is also configured, in some examples, to select a subset of client devices 105, when a plurality of client devices 105 are deployed in the system 100, to receive status notifications. Such a selection may be based, for example, on the location of the client devices 105 within the retail environment. The selection can also be based on roles assigned to the client devices 105 and stored in the repository (e.g. a stocking role, a label maintenance role, and the like).

Responsive to transmitting the status notifications, the notifier 316 is also configured to track the status notifications. In particular, the notifier 316 stores a record of any status notifications transmitted, and an indication of whether each status notification has been resolved (e.g. via the receipt of a message at the server 101 identifying a status notification and indicating that the corresponding mismatch has been resolved).

Variations to the above are contemplated. For example, the system 100 can also include an intermediate server (not shown) in communication with the server 101. Rather than sending and receiving data (e.g. data capture requests, status notifications and the like) directly to and from the client device 105, the server 101 is configured in such examples to exchange the above-mentioned data with the intermediate server, which is then configured to exchange the data with the client device 105.

Figure 10:
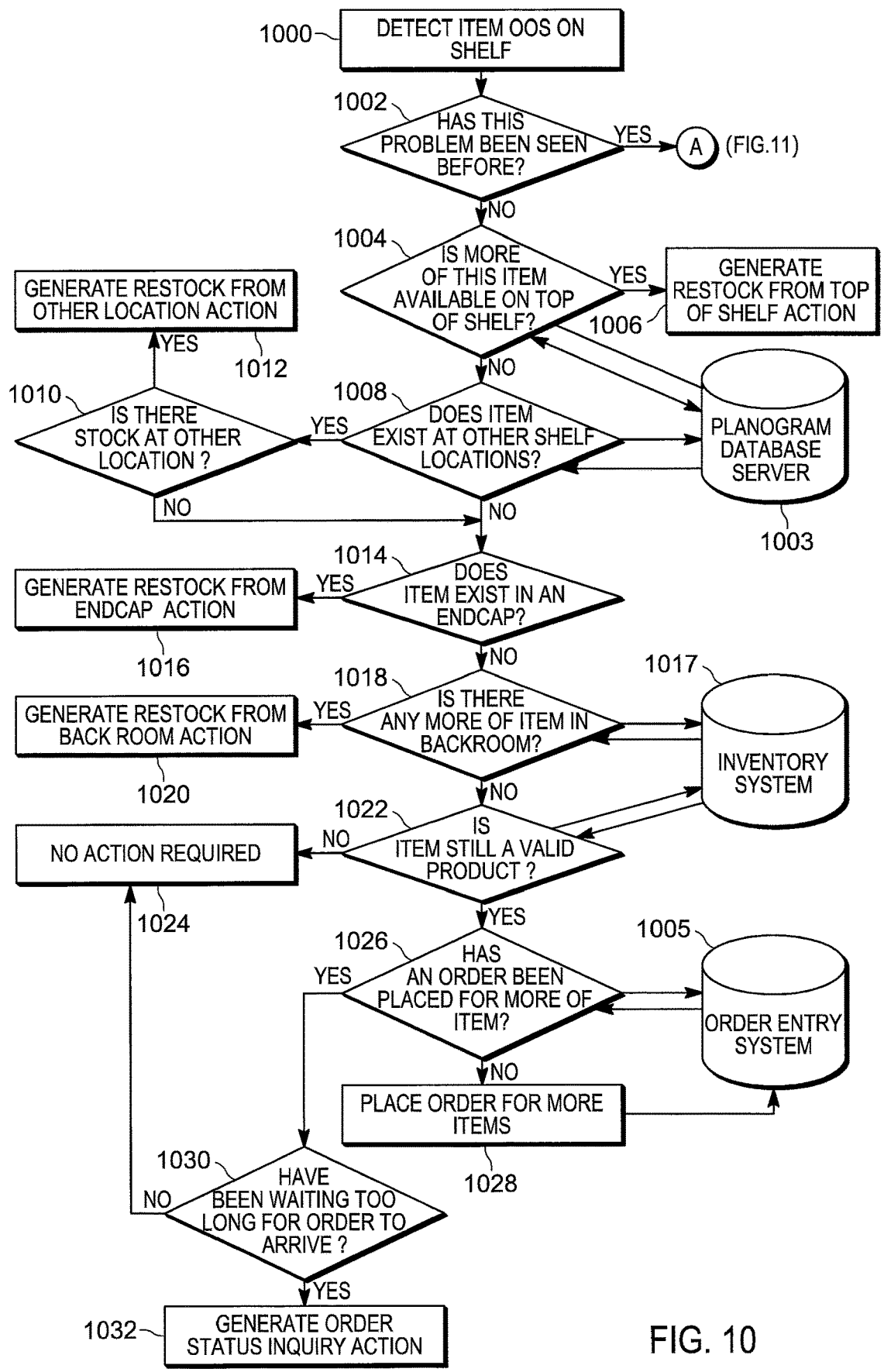
FIGS. 10-11 are flowcharts depicting an embodiment of a method of generating electronic notifications based on product status detection of FIG. 4.
Figure 11:
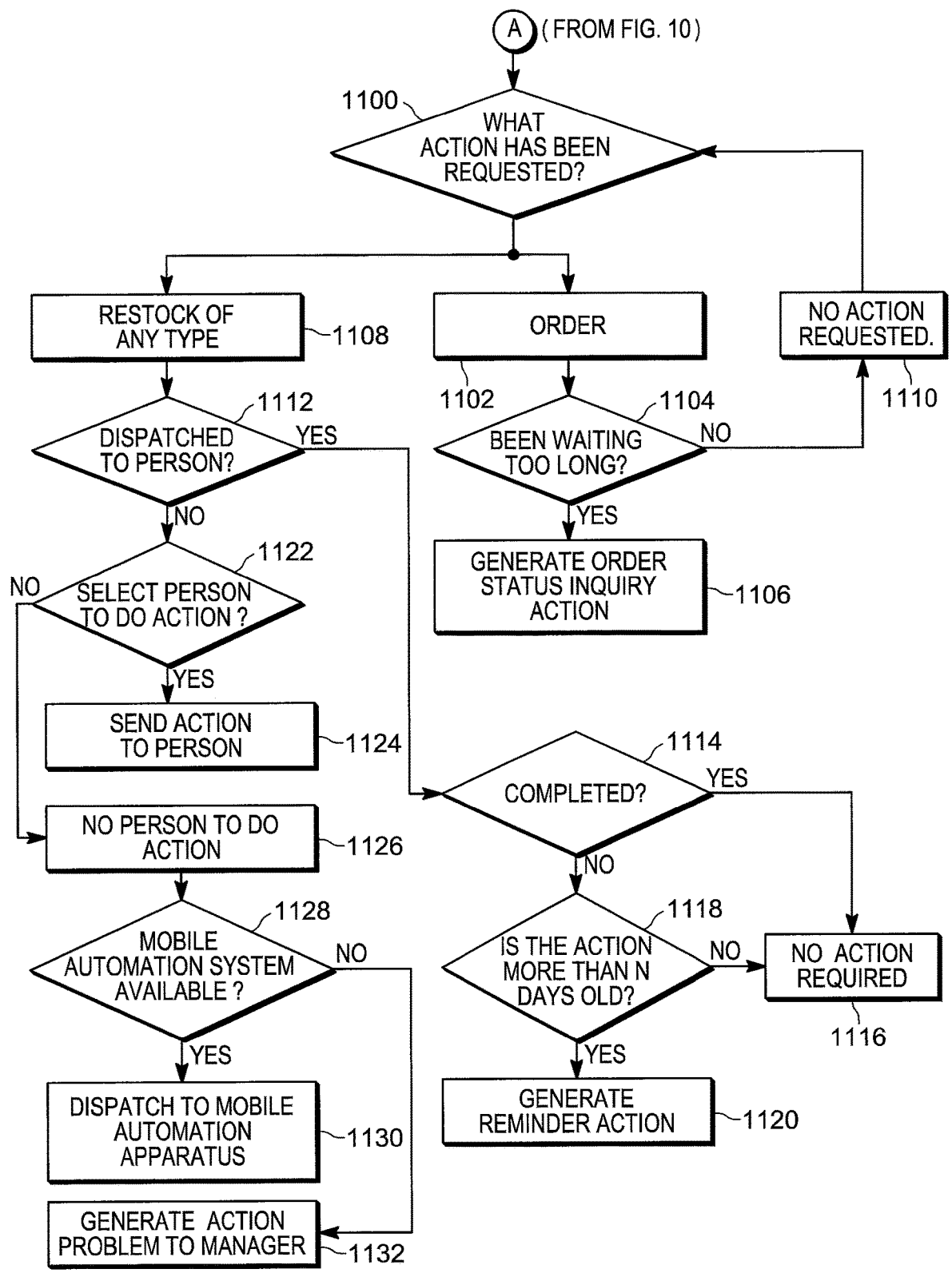

FIGS. 10-11 illustrate a further embodiment of a method of generating electronic notifications, for example responsive to product status detection and generation of corresponding mismatch records of block 430 of FIG. 4. Referring to FIG. 10, in blocks 1000-1002, the notifier 316 of the server 101 identifies a mismatch record as discussed above, for example by detecting an out-of-stock item, and determines whether the corresponding item has been previously detected as being out-of-stock. If the answer is Yes, processing continues to point A in FIG. 11, which is discussed in further detail below. Otherwise, in block 1004, if the item has not been previously detected to be out-of-stock, the notifier 316 queries a database, such as a planogram database server system 1003 that also stores a realogram with the captured secondary data objects, to determine whether additional quantities of the out-of-stock item are available at the top shelf of the same, or nearby, aisle/location based on the realogram. If the answer is Yes, the notifier 316 generates an electronic notification to restock the missing item from the top of the shelf, block 1006. In an embodiment, the electronic action notifications generated by the notifier 316 are pushed to one or both the backend order entry computer system 1005 and the client computing device 105 (FIG. 1). If the item is not available from the top shelf at the same, or nearby, location, in block 1008, the notifier 316 queries the database 1003 to determine whether the item exists at other shelf locations. If the answer is Yes and the item is actually stocked at the other shelf location(s) (e.g., based on checking realogram data), then the notifier 316 generates a notification to restock the item from the other shelf location(s), blocks 1010, 1012. If the item is either not supposed to be stocked at the other shelf location(s) or is out-of-stock at the other shelf location(s), the notifier 316 checks whether the out-of-stock item is supposed to be stocked (and whether it is actually stocked) at an endcap of one or more aisles, block 1014. When the item is at an end cap of one or more aisles, the notifier 316 generates a restock from end cap action alert, block 1016. Otherwise, in block 1018, the notifier 316 checks the inventory computer system 1017 whether the item is stocked in the backroom. If the item is stocked in the back room, in block 1020, the notifier 316 generates a restock from back room action alert. Otherwise, the notifier 318 determines whether the item is still a valid product, block 1022. If the item no longer corresponds to a valid product, the process stops and no action alert is generated, block 1024. Otherwise, in block 1026, the notifier 316 queries the order entry computer system 1005 to determine whether an order has been placed for the out-of-stock item and generates an electronic notification to place the order when the order has not been placed (block 1028). If, on the other hand, the order had previously been placed and a predetermined time interval has lapsed, the notifier 316 generates an order status inquiry alert, blocks 1030, 1032. If the predetermined time interval has not yet passed, no additional action alert is generated.

Referring to FIG. 11, when in blocks 1000, 1002 of FIG. 10 the notifier 316 determines that the mismatch record corresponding to an item has already been previously detected (e.g., an item has previously been determined to be out-of-stock), the notifier 316 determines whether an order has been placed or a restock action has been generated, block 1100. If the order for an item has already been placed, the notifier 316 determines whether a predetermined time period has passed from the order entry date and, if so, generates an order status inquiry action, blocks 1102, 1104, 1106. If the predetermined time period has not yet passed, no further action is requested, block 1110. In blocks 1108, 1112, when a restock alert has been previously generated, the notifier 316 determines whether a person has been dispatched. If the dispatched person has completed the action corresponding to the restock alert, no further action alerts are generated, blocks 1114, 1116. Otherwise, in blocks 1118, 1120, the notifier 316 determines whether a predetermined time period has passed, and if so, generates a reminder action alert. In blocks 1112, 1122, 1124, if a person has not yet been dispatched in response to a prior restock alert, the notifier 316 transmits the restock action alert to a person selected among the available personnel (e.g., based on tracking the task completion status input from a plurality of mobile devices operated by the facility personnel). In blocks 1126, 1128, when personnel to act on the outstanding restock action alert is not available, the notifier 316 checks whether the mobile automation apparatus 103 is available (e.g., whether the mobile automation apparatus is currently idle and is scheduled to remain idle for a time period estimated for the restocking action to be executed). In block 1130, if the mobile automation apparatus is available, the server 101 dispatches the mobile automation apparatus 103 to perform the restocking action (e.g., delivering the out-of-stock item to the designated location in an aisle for further handling by the store personnel). In one embodiment, the designated location to which the mobile automation apparatus delivers the out-of-stock item is the location of the missing item according to the planogram and/or realogram. In another embodiment, the location to which the mobile automation apparatus delivers the out-of-stock item is designated by the store personnel via the mobile device 105. Finally, in block 1132, if the mobile automation apparatus 103 is not available, the notifier 316 generates a notification regarding current resource unavailability to address the out-of-stock issue and forwards this notification to a communication device associated with a designated user, such as a store manager.

Embodiments of the above method of generating electronic notifications involve a multiple layered solution that addresses each of the problems outlined above so that the entire shelf management problem can be solved. An embodiment of this solution consists of the following layers:

Problem Detection layer;
Solution Generation layer;
Actor Selection layer; and
Action tracking layer;

As described above, the problem detection layer generates a list of problems from a scan of the shelf contents. Each problem will be time and location tagged. An embodiment of the solution generation layer involves specific programming of a rules based or machine learning engines (such as a Drools rules engine and/or neural networks or the like) to select the best action based upon the various inputs and desired behaviors. In an embodiment, there are interfaces to data bases that store:

Problems just discovered;
Problem priority (e.g. revenue impact of the problem);
Previously discovered problems (including copies of recently discovered problems);
Actions performed on previously discovered problems;

There may also be interfaces to computer systems that contain:

Product inventory;
Location of product;
Current and pending orders;
Product price;
Desired product location and quantity;

An embodiment of the specially configured rules operate on the combined set of problems and other sources of data to select the proper action. It should be noted that other techniques besides rules may be used to select correct action. One could utilize a neural network/AI (artificial intelligence) framework that would be "trained" to select the proper action. As those of ordinary skill in the art will realize, such a framework would be more flexible than a rules based engine but may take more time to create.

The foregoing description, including FIGS. 10-11, shows a typical decision process for dealing with an item that is out of stock in one location within a retail store. Depending on whether the problem has been seen before, whether the product is present at other locations within the store, and/or whether an order has already been placed for more of the item, different types of actions will be generated.

The Actor selection layer will select the proper person, role, or autonomous system to perform each action. It will use a specially configured rules engine (or neural network) that will operate on the following data items in order to select the proper person, role, or system for the action:

The specific action;
Whether an autonomous system exists that can perform the action;
If there is not a suitable system, then:
The skills of each staff member;
The work schedule of each staff member;
The number of assigned action to each staff member;

In an embodiment, the rules engine will assign the action to the autonomous system or staff member best suited for the particular action. It may be that both a system and multiple staff are able to perform the action and so the system may assign the action to both a system as well as one or more personnel. If no system is available, then the action may be assigned to one or more personnel. Actions may also be assigned to "roles" (such as store manager) rather than to individual people. This may apply when several people are assigned to the position rather than just one.

An embodiment of the action tracking layer will notify each staff member of the actions assigned to them and monitor how long it takes them to accomplish it. It may also schedule an autonomous system to do the action. Each staff member will have a to do list that contains a prioritized list of actions to be taken and a means to indicate the action has been completed. It will also contain a means for a staff member to indicate that an action could not be completed along with a reason (e.g., via a mobile device with various modalities, such as voice, data, visual user interface, heads up display, and the like).

The results of the action tracking layer will be analyzed to determine the performance of each staff member as well as to determine the expected time to complete each type of action based upon the experiences of similar actions. If an action cannot be completed, the problem and action will be resubmitted to the solution generation layer in order to devise a new action. The action tracking system will also monitor the performance of autonomous systems, including one or more mobile automation apparatuses described above, to see how well they perform the assigned tasks, including tracking the time of task completion, which may be used for notification and/or task flow adjustments.

In the foregoing specification, specific embodiments have been described.

However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A product status detection system, comprising:
a mobile automation apparatus having a sensor configured to capture data representing a shelf supporting products, responsive to data capture instructions received at the mobile automation apparatus;
a server in communication with the mobile automation apparatus via a network, and having an imaging controller including:
a mobile apparatus processor configured to generate data capture instructions and transmit the data capture instructions to the mobile automation apparatus;
a repository configured to store captured data received via the network from the mobile automation apparatus;
a primary object generator configured to retrieve the captured data and generate a plurality of primary data objects from the captured data, each of the primary data objects including a location in a common frame of reference;
a secondary object generator configured to generate a set of secondary data objects based on the primary data objects, and to store the secondary data objects in the repository;
a detector configured to compare the secondary data objects with reference data obtained from the repository, and to generate mismatch records identifying mismatches between the reference data and the secondary data objects; and
a notifier configured to select a subset of the mismatch records, generate a status notification corresponding to the subset of mismatch records, and transmit the status notification via the network; and
a client computing device configured to receive the status notification via the network and display the status notification,
wherein:
the secondary object generator is further configured to store the secondary data objects as nodes in a tree data structure, the nodes of the tree data structure including at least one of product indicator data objects and label data objects.

2. The system of claim 1, wherein the sensor of the mobile automation apparatus includes an image sensor and a depth sensor.

3. The system of claim 1, wherein the data capture instructions indicate a data capture region within the common frame of reference.

4. The system of claim 1, wherein the primary data objects include one or more of: an object indicator identifying a product supported on the shelf, a gap indicating a space between products on the shelf, and a shelf edge indicating the position of an edge of the shelf.

5. The system of claim 1, wherein generating the secondary data objects includes at least one of: (i) discarding a primary data object with a location matching the location of another primary data object, and (ii) merging at least two primary data objects.

6. The system of claim 1, wherein the server is further configured to discard the primary data objects responsive to generation of the secondary data objects.

7. The system of claim 1, wherein the detector further is configured to convert the reference data into a corresponding tree data structure, and to compare the nodes of the tree data structure with nodes of the corresponding tree data structure.

8. The system of claim 1, wherein each mismatch record includes a mismatch type identifier.

9. The system of claim 8, wherein the mismatch type identifiers are selected from the group consisting of: out of stock, low stock, and plug.

10. The system of claim 1, further comprising:
an intermediate server in communication with the server via the network, configured to receive the status alert from the server and transmit the status alert to the mobile device.

11. The system of claim 10, wherein the intermediate server is further configured to receive a data capture request from the mobile device, and to transmit the request to the server for generation of data capture instructions.

12. The system of claim 1, wherein the notifier transmits the status notification to the mobile automation apparatus.

13. The system of claim 12, wherein the status notification is a restocking notification.

14. The system of claim 12, wherein the status notification is a label correction notification.

15. The system of claim 8, wherein the mismatch type identifier is an incorrect label price identifier.

16. The system of claim 8, wherein the mismatch type identifier is a missing label identifier.

\* \* \* \* \*